(12) United States Patent
Elmer

(10) Patent No.: US 10,428,627 B2
(45) Date of Patent: Oct. 1, 2019

(54) CONTROLLED PNEUMATIC WELL PUMPING SYSTEM, AND METHOD FOR OPTIMIZING PUMP STROKE SPEED

(71) Applicant: Encline Artificial Lift Technologies LLC, Houston, TX (US)

(72) Inventor: William G. Elmer, Tyler, TX (US)

(73) Assignee: Encline Artificial Lift Technologies LLC, Houston, TX (US)

( * ) Notice: Subject to any disclaimer, the term of this patent is extended or adjusted under 35 U.S.C. 154(b) by 267 days.

(21) Appl. No.: 15/258,755

(22) Filed: Sep. 7, 2016

(65) Prior Publication Data

US 2017/0074079 A1    Mar. 16, 2017

Related U.S. Application Data

(63) Continuation-in-part of application No. 15/053,163, filed on Feb. 25, 2016, now abandoned.
(Continued)

(51) Int. Cl.
*E21B 43/12* (2006.01)
*E21B 47/00* (2012.01)
(Continued)

(52) U.S. Cl.
CPC ........ *E21B 43/126* (2013.01); *E21B 47/0007* (2013.01); *F04B 9/1273* (2013.01);
(Continued)

(58) Field of Classification Search
CPC ............... E21B 43/121; E21B 41/0092; E21B 47/0007; F04B 47/022; F04B 47/026;
(Continued)

(56) References Cited

U.S. PATENT DOCUMENTS

| 3,343,409 A | 9/1967 | Gibbs |
| 3,858,688 A | 1/1975 | Galloway |

(Continued)

OTHER PUBLICATIONS

CIPO Office Action dated Jul. 19, 2018 in Canadian Application No. 2,941,546 (2 pages).
(Continued)

*Primary Examiner* — Mouloucoulaye Inoussa
(74) *Attorney, Agent, or Firm* — Peter L. Brewer; Thrive IP

(57) ABSTRACT

A closed loop pneumatic pumping system is provided. The system uses a gas compressor and a high pressure gas tank to exert pneumatic pressure against a reciprocating piston over a wellbore. The piston is connected to a rod string and downhole pump for pumping formation fluids from a wellbore. The system includes an electronic controller that controls movement, including pump speed of the piston as it cycles between upstrokes and downstrokes within a cylinder over the wellbore. In one aspect, speed is controlled by adjusting a speed of the compressor. In another aspect, speed is controlled by adjusting the position of an upstroke control valve and a downstroke control valve. In one aspect, the pump stroke controller is configured to adjust a speed of the upstroke and a speed of the downstroke in response to signals indicative of pump fillage. A method for optimizing pneumatic pumping speed at a wellbore is also provided herein.

21 Claims, 9 Drawing Sheets

Related U.S. Application Data

(60) Provisional application No. 62/217,090, filed on Sep. 11, 2015.

(51) Int. Cl.
  *F04B 49/06* (2006.01)
  *F04B 47/02* (2006.01)
  *G05B 19/042* (2006.01)
  *F04B 9/127* (2006.01)

(52) U.S. Cl.
  CPC .......... *F04B 47/022* (2013.01); *F04B 49/065* (2013.01); *G05B 19/042* (2013.01); *F04B 2201/0201* (2013.01); *F04B 2201/0202* (2013.01); *G05B 2219/36292* (2013.01)

(58) Field of Classification Search
  CPC ........ F04B 49/065; F04B 49/20; F04B 49/22; F04B 53/144; F04B 53/16; F04B 9/123; G05B 19/042; G05B 19/106; G05B 11/01; G05B 19/054
  See application file for complete search history.

(56) References Cited

U.S. PATENT DOCUMENTS

| | | | |
|---|---|---|---|
| 3,951,209 | A | 4/1976 | Gibbs |
| 4,102,394 | A | 7/1978 | Botts |
| 4,490,094 | A | 12/1984 | Gibbs |
| 4,545,737 | A | 10/1985 | Stanton |
| 4,873,635 | A | 10/1989 | Mills |
| 5,006,044 | A | 4/1991 | Walker, Sr. et al. |
| 5,012,898 | A | 5/1991 | Tsymberov |
| 5,167,490 | A | 12/1992 | McKee et al. |
| 5,252,031 | A | 10/1993 | Gibbs |
| 6,112,607 | A | 9/2000 | Pauls |
| 6,152,706 | A | 11/2000 | Lund |
| 6,234,361 | B1 | 5/2001 | Bloom |
| 6,244,836 | B1 | 6/2001 | Jordan et al. |
| 6,257,455 | B1 | 7/2001 | Trepina et al. |
| 6,536,508 | B1 * | 3/2003 | Sample ................... B21C 33/02 164/113 |
| 6,641,375 | B2 | 11/2003 | Liao |
| 7,500,390 | B2 | 3/2009 | Mills |
| 7,762,321 | B2 | 7/2010 | Fesi et al. |
| 7,891,237 | B2 | 2/2011 | Mills |
| 8,256,504 | B2 | 9/2012 | Brown |
| 2005/0095140 | A1 | 5/2005 | Boren |
| 2009/0194291 | A1 | 8/2009 | Fesi et al. |
| 2014/0129037 | A1 * | 5/2014 | Peterson ............. E21B 47/0008 700/282 |
| 2014/0231093 | A1 * | 8/2014 | Hoell ................... E21B 43/121 166/372 |

OTHER PUBLICATIONS

Jeffrey Lovelace, "The Evolution of Rod Pump Control," www.upstreampumping.com (Dec. 2013).
Jyothi Swaroop Samayamantula, "Target Rod Pump Efficiency to Keep Production Consistent," www.upstreampumping.com (Mar. 2014).
Jay Anderson, "Optimizing Rod and Progressing Cavity Pumps With Pump Control and Automation," www.upstreampumping.com (Dec. 2013).
Maurice M. Patterson, "A Pump-Off Detector System," Society of Petroleum Engineers (Oct. 1979).
David L. Divine, "Automatic Pump-Off Control for the Variable Speed Submergible Pump," Society of Petroleum Engineers (Sep. 1980).
J.N. McCoy, "Beam Pumping Balancing Based on Motor Power Utilization," Canadian Institute of Mining (Jun. 1995).
O.L. Rowlan, "Best Method to Balance Torque Loadings on a Pumping Unit Gearbox," Canadian Institute of Mining (Jun. 2004).
Joe Amezcua, "Comparative Analysis of Pump-Off Control Systems for Field Applications," Society of Petroleum Engineers (Sep. 1980).
S.G. Gibbs, "Computing Gearbox Torque and Motor Loading for Beam Pumping Units," Society of Petroleum Engineers (Sep. 1975).
J.E. Bullock, "Electrical Savings in Oil Production," Society of Petroleum Engineers (Apr. 1987).
C.G. Guffey, Field Testing of Variable-Speed Beam-Pump Computer Controller, Society of Petroleum Engineers (May 1991).
J.N. McCoy, "How to Maintain High Producing Efficiency in Sucker Rod Lift Operations," Society of Petroleum Engineers (Mar. 2003).
J.N. McCoy, "Minimzing Energy Cost by Maintaining High Volumetric Pump Efficiency," Society of Petroleum Engineers (Oct. 2002).
S.G. Gibbs, "Monitoring and Controlling Rod Pumped Wells Using Downhole Pump Cards," Canadian Institute of Mining (May 1995).
J.L. Mogollon, "New Technologies for Optimizing Energy-Fluid Input and Flow Assurance," Intl Petroleum Technology Conference (Jan. 2014).
0. Lynn Rowlan, "Overview of Beam Pump Operations," Society of Petroleum Engineers (Nov. 2007).
R. Peterson, "Production Increases at PDVSA Using an Improved SRP Control," Society of Petroleum Engineers (Sep. 2006).
R.J. Yoch, "Pump-Off Control Application in Thermal Recovery Operations," Society of Petroleum Engineers (Apr. 1987).
M.S. Reedy, "Reducing Electric Pumping Consumption in Mature Fields," Society of Petroleum Engineers (May 2006).
G. Wayne Westerman, "Successful Application of Pump-Off Controllers," Society of Petroleum Engineers (Oct. 1977).
C. .L. Dunham, "Supervisory Control of Beam Pumping Wells," Society of Petroleum Engineers (Mar. 1987).
E. Torseke, "Advanced Rod Pump Control," 49th Annual Southwestern Petroleum Shortcourse (2002).
O.L. Rowlan, "Use of Pump Slippage Equation to Design Pump Clearances," ALRDC 8th Annual Rod Pumping Workshop (Sep. 2012).
William Elmer, "New Method to Reduce Pump Slippage," ALRDC 11th Annual Sucker Rod Pumping Workshop (Sep. 2015).
Kyle Chambliss, "Plunger Leakage and Viscous Drag for Beam Pump Systems," Texas Tech University Thesis (Aug. 2001).
Lufkin Speed Control and Well Monitoring Package for Rod Pump applications described at https://customers.lufkauto.net, accessed Mar. 9.
Lufkin Well Manager Rod Pump Controller described at www.pumpsandservice.com, accessed Mar. 9, 2016.
Lufkin Well Manager Rod Pump Controller described at www.geoilandgas.com, accessed Mar. 9, 2016.
Sam Gibbs, "Computer Diagnosis of Down-Hole Conditions in Sucker Rod Pumping wells," Journal of Petroleum Technology (Jan. 1966).
S.R.V. Campos, "Right Time Decision of Artificial Lift Management for Fast Loop Control," Society of Petroleum Engineers (Apr. 2006).
T.A. Everitt, An Improved Finite-Difference Calculation of Downhole Dynamometer Cards for Sucker-Rod Pumps, SPE Production Engineering (Feb. 1992).
H.C. Tait, "A Rod Pumping System for California Lift Requirements," Society of Petroleum Engineers (Mar. 1983).
J.J. DaCunha, "Modeling a Finite-Length Sucker Rod Using the Semi-Infinite-Wave Equation and a Proof of Gibbs' Conjecture," SPE Journal (Jun. 2008).
Paul Jesperson, The HEP (Hydraulic, Electronic, Pneumatic) Pumping Unit, Society of Petroleum Engineers (Oct. 1981).

\* cited by examiner

CONTROLLED PNEUMATIC WELL PUMPING SYSTEM, AND METHOD FOR OPTIMIZING PUMP STROKE SPEED

CROSS REFERENCE TO RELATED APPLICATIONS

This application claims the benefit of U.S. Ser. No. 62/217,090 filed Sep. 11, 2015. That application is entitled "Pneumatic Control System for Well Pumping, and Method for Optimizing Pump Stroke Speed," and is incorporated herein in its entirety by reference.

This application also claims priority to U.S. Ser. No. 15/053,163 filed Feb. 25, 2016. That application is entitled "Well Pumping System Having Pump Speed Optimization," and is also incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field Of The Invention

The present disclosure relates to the field of hydrocarbon recovery operations. More specifically, the present invention relates to a pneumatic compression system to support artificial lift for a wellbore, and methods for optimizing pumping speed for a pneumatic pumping unit to control the lift of production fluids to the surface.

Technology In The Field Of The Invention

In the drilling of oil and gas wells, a wellbore is formed using a drill bit that is urged downwardly at a lower end of a drill string. The drill bit is rotated while force is applied through the drill string and against the rock face of the formation being drilled. After drilling to a predetermined depth, the drill string and bit are removed and the wellbore is lined with a string of casing.

In completing a wellbore, it is common for the drilling company to place a series of casing strings having progressively smaller outer diameters into the wellbore. These include a string of surface casing, at least one intermediate string of casing, and a production casing. The process of drilling and then cementing progressively smaller strings of casing is repeated until the well has reached total depth. In some instances, the final string of casing is a liner, that is, a string of casing that is not tied back to the surface. The final string of casing, referred to as a production casing, is also typically cemented into place.

To prepare the wellbore for the production of hydrocarbon fluids, a string of production tubing is run into the casing. The production tubing serves as a conduit for carrying production fluids to the surface. A packer is optionally set at a lower end of the production tubing to seal an annular area formed between the tubing and the surrounding strings of casing.

In order to carry the hydrocarbon fluids to the surface, a pump may be placed at a lower end of the production tubing. This is known as "artificial lift." In some cases, the pump may be an electrical submersible pump, or ESP. ESP's utilize a hermetically sealed motor that drives a multi-stage pump. More conventionally, oil wells undergoing artificial lift use a downhole reciprocating plunger-type of pump. The reciprocating downhole pump is relatively long and thin to avoid restricting oil flow up the well. The pump has one or more valves that capture fluid on a downstroke, and then lift the fluid on the upstroke. This is known as "positive displacement." In some designs such as that disclosed in U.S. Pat. No. 7,445,435, the pump may be able to both capture fluid and lift fluid on each of the downstroke and the upstroke.

Conventional positive displacement pumps have a barrel that is reciprocated at the end of a "rod string." The rod string comprises a series of long, thin joints of pipe that are threadedly connected through couplings. The rod string is pivotally attached to a pumping unit at the surface. The rod string moves up and down within the production tubing to incrementally lift production fluids from subsurface intervals to the surface.

Most pumping units on land are so-called rocking beam drive units. Rocking beam units typically employ electric motors or internal combustion engines having a rotating drive shaft. The shaft turns a crank arm, or possibly a pair of crank arms. The crank arms, in turn, have heavy, counter-weighted flywheels. The flywheels rotate along with the crank arms and provide weighted leverage for lifting the rod string. Rocking beam units also have a so-called walking beam that pivots over a fulcrum. One end of the walking beam is mechanically connected to the crank arms. As the crank arms and flywheels rotate, they cause the walking beam to reciprocate up and down over the fulcrum.

The opposite end of the walking beam is a so-called horse head. The horse head is positioned over the wellhead at the surface. As the walking beam is reciprocated, the horse head cycles up and down over the wellbore. This, in turn, translates the rod and attached pump up and down within the wellbore. A drawing and further description of a walking beam unit are provided in U.S. Pat. No. 7,500,390, which is incorporated herein in its entirety by reference.

Another type of pumping unit is a hydraulic actuator system. These systems employ an elongated cylinder residing over a wellbore. The cylinder is axially aligned with the wellbore and holds a reciprocating piston. The cylinder cyclically receives fluid pressure through an oil line. As fluid is injected through the oil line and into the cylinder, the piston is caused to move linearly within the cylinder. This, in turn raises the connected rod string, causing the pump to undergo an upstroke. When fluid pressure is released from the cylinder, the rod string is lowered due to gravitational forces, causing the downhole pump to undergo a downstroke. Oil is returned to a reservoir, or pressure tank, and is then pumped back into the cylinder for the next upstroke.

A similar but much less common system is a pneumatic pumping system. These systems also employ a cylinder residing over a wellbore. The cylinder is axially aligned with the wellbore and also holds a reciprocating piston. In this arrangement, the piston is reciprocated up and down through the cyclical injection of a working gas (such as air) against the piston on the upstroke, and the bleeding of the working gas from the cylinder in the downstroke. In the case of air, the air is just vented to the atmosphere.

Pneumatic pumping systems have an advantage over hydraulic pumping systems in that they do not require an oil reservoir, a cooler, or elaborate valving. Pneumatic systems have traditionally required only a compressor, a timer and a large supply of warm gas. However, pneumatic systems have been used with simple shallow wells and have not been provided with intelligence that controls pumping speed.

Therefore, a need exists for a pneumatic pumping system that offers a controller that controls pump cycle time and pumping speed. In addition, a need exists for a pumping system that is able to vary upstroke speed and downstroke speed by controlling the rate at which a working gas is pumped from a high pressure tank and into a cylinder, and then released from the cylinder and into a low pressure tank as part of a closed loop system.

BRIEF SUMMARY OF THE INVENTION

A pneumatic pumping system is first provided herein. The pumping system is designed to operate at a well site for the purpose of providing reciprocating motion to a positive displacement pump in a wellbore. In this way, formation fluids may be pumped to the surface for processing and/or sale.

The wellbore may be completed in a vertical orientation. Alternatively, the wellbore may be completed in a horizontal (or other deviated) orientation.

The pneumatic pumping system first includes a cylinder. The cylinder is disposed over the wellbore in a vertical orientation. The cylinder defines an elongated tubular body having a sealed upper end.

The system also includes a piston and a connected polished rod. The piston and connected polished rod reside within the cylinder. The piston is movable between upper and lower rod positions within the cylinder, forming pumping cycles.

The system additionally comprises a rod string. The rod string is mechanically connected to and extends downwardly from the polished rod. The rod string is configured to extend into the wellbore.

The pneumatic pumping system also includes a positive displacement pump. The positive displacement pump is disposed at a lower end of the rod string. The pump is configured to pump formation fluids from the wellbore.

The pumping system further includes a high pressure gas tank, and one or more low pressure gas tanks. In one aspect, the high pressure gas tank is maintained at about 300 to 800 psi, while each of the one or more low pressure gas tanks is maintained at about 70 to 120 psi. Other pressure ranges may be utilized depending on rod load.

The system also comprises a compressor. The compressor is configured to pump a working gas from the one or more low pressure gas tanks into the high pressure gas tank, and then into the cylinder. This may be, for example, through a fluid inlet line. It is observed that because the system uses a compressible gas to lift the cylinder, the system stores energy from the low pressure gas tanks tank during the downstroke.

Pumping the working gas into the cylinder serves to create an upstroke of the piston and the operatively connected downhole pump. Of interest, the low pressure gas tanks are configured to receive the working gas from the cylinder during a downstroke of the piston. This is unlike hydraulic pumping systems that use an incompressible fluid. Hydraulic pumping systems simply unload during the downstroke, meaning no work is done and no energy is stored. Load on the hydraulic supply pump is normally only seen during the upstroke, so the load goes from 0% to full with each downstroke. This practice is very difficult for gas engines, especially if the operator needs to meet air emissions.

The pneumatic pumping system also includes a position sensor. The position sensor is disposed along the cylinder to monitor a vertical position and travel direction of the piston within the cylinder. Additionally, the system includes a pressure transducer. The pressure transducer is configured to monitor pressure within the cylinder during pump cycles.

The system additionally has a programmable logic controller. The controller is configured to receive signals from the position sensor and the pressure transducer, and from those signals adjust upstroke speed, downstroke speed, or both. Adjusting pump speeds may optimize pump fillage and minimize pump slippage.

In one aspect, the pneumatic pumping system further comprises:
  a fluid inlet line that delivers working gas from the high pressure gas tank to the cylinder during the upstroke;
  a fluid outlet line that delivers working gas from the cylinder to the one or more low pressure gas tanks during the downstroke;
  a downstroke control valve along the fluid outlet line configured to adjust a rate of downstroke of the piston and operatively connected pump in response to control signals; and
  an upstroke control valve along the fluid inlet line configured to adjust a rate of upstroke of the piston and operatively connected pump also in response to control signals.

Adjustments to the valves may be in response to signals from the controller. Those signals, in return, may be based on velocity calculations made by the controller using signals received from the position sensor.

In one aspect of the pumping system, the controller is configured to calculate a downstroke speed of the piston in real time based upon position sensor readings, and adjust a position of the downstroke control valve to smooth out the downstroke speed, or to slow the downstroke speed. In a preferred aspect, the controller is configured to operate the system at a downstroke speed that is less than the upstroke speed.

A method of optimizing pump stroke speed for a pneumatic pumping system is also provided herein. The method first includes providing a wellbore. The wellbore has been formed for the purpose of producing hydrocarbon fluids to the surface in commercially viable quantities. The wellbore has a rod string extending down into the wellbore, and a positive displacement pump disposed along a bottom end of the rod string.

The method also includes providing a pneumatic pumping system. The pumping system is in accordance with the pumping system described above, in its various embodiments. For example, the pumping system may comprise:
  an elongated cylinder defining a tubular body and residing vertically over a wellbore;
  an elongated polished rod residing substantially within the cylinder, the polished rod being operatively connected to the rod string and connected pump;
  a piston connected to the polished rod that is movable between upper and lower positions within the cylinder;
  a high pressure gas tank;
  a compressor configured to pump a working gas from the low pressure gas tanks and into the high pressure gas tank, to be subsequently released into the cylinder to create an upstroke of the piston and the operatively connected pump;

the one or more low pressure gas tanks configured to receive the pumped working gas from the cylinder during a downstroke of the piston; and a controller configured to receive signals from a position sensor residing along the cylinder and a pressure transducer.

The method also includes operating the compressor to pump formation fluids from the wellbore by means of upstrokes and downstrokes. Each upstroke and downstroke forms a pump cycle.

The method then may include adjusting a pump speed to minimize pump slippage, or to maximize pump fillage. Preferably, the controller is configured to operate the system at a downstroke speed that is less than the upstroke speed.

In one embodiment, the pneumatic pumping system further comprises one or more position sensors disposed along the cylinder to monitor a vertical position and travel direction of the piston within the cylinder. The system further includes a pressure transducer configured to monitor pressure within the cylinder. The position sensor and the pressure transducer send electrical signals to the controller during the pump cycles.

In another embodiment, the pneumatic pumping system further comprises:

a fluid inlet line that transports working gas from the high pressure gas tank to the cylinder during the upstroke;

a fluid outlet line that delivers working gas from the cylinder to the one or more low pressure gas tanks during the downstroke;

a downstroke control valve along the fluid outlet line configured to adjust a rate of downstroke of the piston in response to control signals; and an upstroke control valve along the fluid inlet line configured to adjust a rate of upstroke of the piston and operatively connected pump in response to control signals.

In this embodiment, the rate of the downstroke is adjusted by signals sent by the controller to the downstroke control valve while the rate of upstroke is adjusted by signals sent by the controller to the upstroke control valve. If the upstroke control valve is wide open but a further increase in upstroke velocity is desired, then the operational speed of the compressor is increased. However, as a general rule in this disclosure, adjusting pump speed generally means controlling pressure within the cylinder by controlling upstroke and downstroke valve positions.

In another aspect, the controller is configured to calculate a downstroke speed of the piston in real time based upon position sensor readings, and adjust a position of the first valve to smooth out the downstroke speed. In still another aspect, adjusting a pump speed to minimize pump slippage comprises the controller increasing or decreasing an orifice size of the upstroke control valve to control cylinder pressure during the upstroke.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
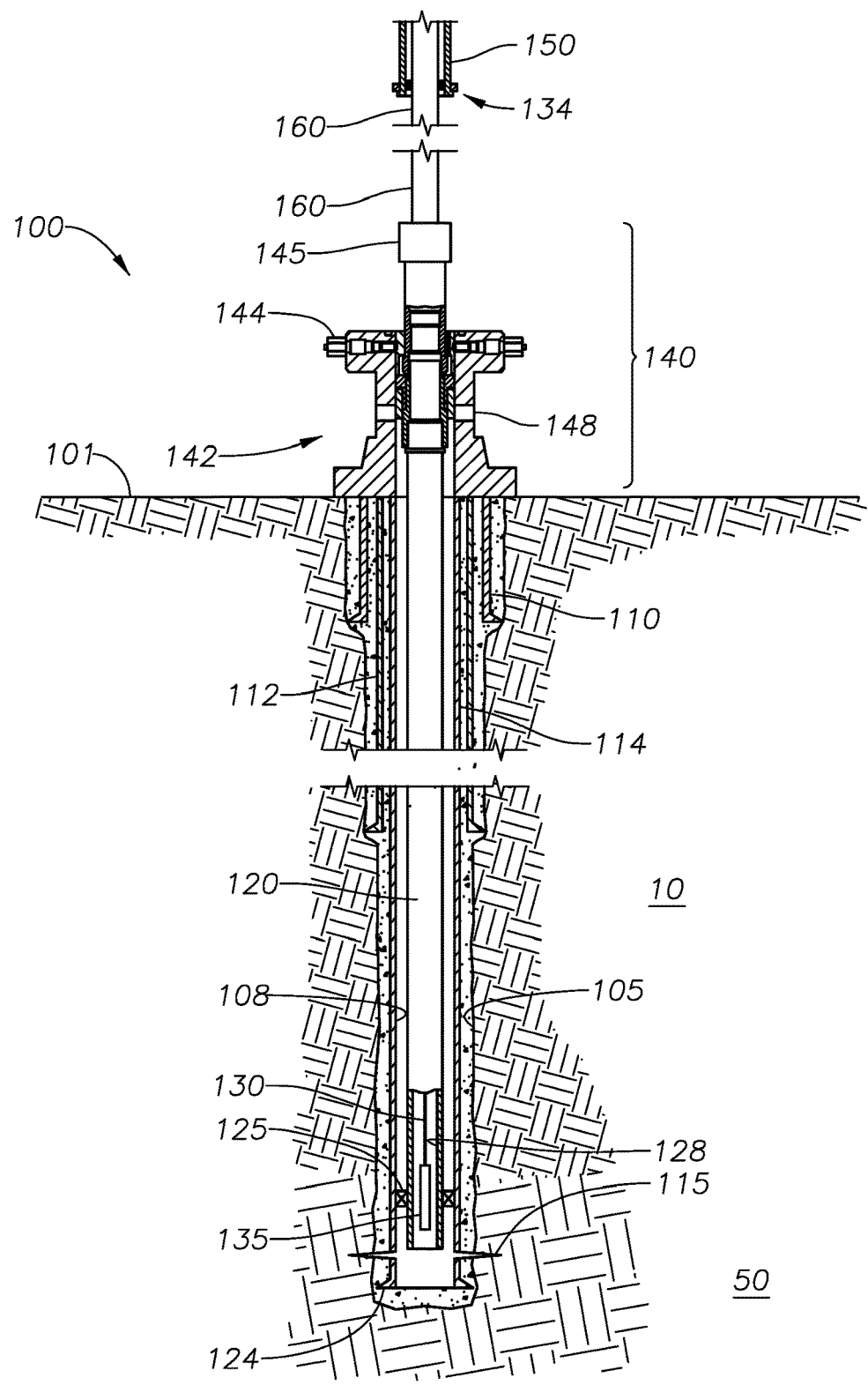
FIG. 1 is a cross-sectional view of a wellbore having been completed for the production of hydrocarbon fluids in commercially viable quantities. A portion of a well head is seen placed over the wellbore, serving as a tubing head.

For purposes of the present application, it will be understood that the term "hydrocarbon" refers to an organic compound that includes primarily, if not exclusively, the elements hydrogen and carbon. Hydrocarbons may also include other elements, such as, but not limited to, halogens, metallic elements, nitrogen, oxygen, and/or sulfur.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions or at ambient condition. Hydrocarbon fluids may include, for example, oil, natural gas, coalbed methane, shale oil, pyrolysis oil, pyrolysis gas, a pyrolysis product of coal, and other hydrocarbons that are in a gaseous or liquid state.

As used herein, the terms "produced fluids," "reservoir fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, oil, natural gas, pyrolyzed shale oil, synthesis gas, coalbed methane, a pyrolysis product of coal, carbon dioxide, hydrogen sulfide and water.

As used herein, the term "fluid" refers to gases, liquids, and combinations of gases and liquids, as well as to combinations of gases and solids, combinations of liquids and solids, and combinations of gases, liquids, and solids.

As used herein, the term "wellbore fluids" means water, hydrocarbon fluids, formation fluids, or any other fluids that may be within a string of production tubing during a production operation.

As used herein, the term "gas" refers to a fluid that is in its vapor phase at in situ conditions.

As used herein, the term "subsurface" refers to geologic strata occurring below the earth's surface.

As used herein, the term "formation" refers to any definable subsurface region regardless of size. The formation may contain one or more hydrocarbon-containing layers, one or more non-hydrocarbon containing layers, an overburden, and/or an underburden of any geologic formation. A formation can refer to a single set of related geologic strata of a specific rock type, or to a set of geologic strata of different rock types that contribute to or are encountered in, for example, without limitation, (i) the creation, generation and/or entrapment of hydrocarbons or minerals, and (ii) the execution of processes used to extract hydrocarbons or minerals from the subsurface.

As used herein, the term "wellbore" refers to a hole in the subsurface made by drilling or insertion of a conduit into the subsurface. A wellbore may have a substantially circular cross section, or other cross-sectional shapes. The term "well," when referring to an opening in the formation, may be used interchangeably with the term "wellbore." Depending on context, the term "bore" refers to the diametric opening formed in the subsurface by the drilling process.

Description of Selected Specific Embodiments

FIG. 1 is a cross-sectional view of a wellbore 100 having been completed for the production of hydrocarbon fluids in commercially viable quantities. The wellbore 100 extends from a surface 101 down into the earth subsurface 10. The surface 101 may be a land surface; alternatively, the surface 101 may be an ocean bottom or a lake bottom or a production platform offshore.

The wellbore 100 defines a bore 105 that is formed using known drilling techniques. The wellbore 100 extends from the surface 101 down to a subsurface formation 50. The subsurface formation 50 contains hydrocarbon fluids in commercially viable quantities. In the view of FIG. 1, the wellbore 100 has been completed in a vertical orientation. However, it is understood that the wellbore 100 may alternatively be completed in a horizontal (or other deviated) orientation. In any instance, the wellbore 100 is completed for the purpose of producing hydrocarbon fluids from the subsurface formation 50 up to the surface 101 using production equipment.

In FIG. 1, the wellbore 100 has been completed by setting a series of pipes into the subsurface 10. These pipes include a first string of casing 110, sometimes known as surface casing or a conductor. These pipes also include at least a second 112 string of casing, and frequently a third string of casing (not shown). The casing string 112 is an intermediate casing string that provides support for walls of the bore 105. Intermediate casing strings may be hung from the surface 101, or they may be hung from a next higher casing string using an expandable liner or a liner hanger. It is understood that a pipe string that does not extend back to the surface is normally referred to as a "liner."

The wellbore 100 is completed with a final string of casing, known as production casing 114. The production casing 114 extends down to the subsurface formation 50. A bottom end 124 of the production casing 114 is shown landed in the subsurface formation 50. The casing string 114 includes perforations 115 which provide fluid communication between the bore 105 and the surrounding subsurface formation 50. In some instances, the final string of casing is a liner.

Each string of casing 110, 112, 114 is set in place through cement (not shown). The cement is "squeezed" into the annular regions around the respective casing strings, and serves to isolate the various formations of the subsurface 10 from the wellbore 105 and each other. In some instances, a production casing is not used and the subsurface formation is left "open." In this instance, a sand screen or a slotted liner may be used to filter fines and solids while permitting formation fluids to enter the bore 105.

The wellbore 100 further includes a string of production tubing 120. The production tubing 120 has a bore 128 that extends from the surface 101 down into the subterranean region 10. The production tubing 120 serves as a conduit for the transmission of reservoir fluids, such as hydrocarbon liquids, to the surface 101. An annular region 108 is formed between the production tubing 120 and the surrounding tubular body 114. A packer 125 is optionally set proximate a bottom of the production tubing 120 to prevent production fluids from flowing up the annular region 108.

It is observed here that the present inventions are not limited to the type of casing arrangement used, so long as the wellbore 100 is completed to facilitate the production tubing and a reciprocating downhole pump.

Extending along the length of the wellbore 100 is a rod string 130. The rod string 130 defines a series of small-diameter, threadedly connected rods that extend down proximate the subsurface formation 50. At a lower end of the rod string 130 is a positive displacement pump 135. The pump is a positive displacement pump is used to artificially lift production fluids up to the surface 101. Reciprocation of the rod string 130 and connected pump 135 will capture production fluids and move them up the wellbore 105.

It is understood by those of ordinary skill in the art that the pump 135 will have various components including a barrel defining a plunger and a traveling valve. One or more ball-and-seat arrangements is typically used for the pump 135. An anchor (not shown) is set at the lower end of the production tubing 120 to prevent a corresponding axial movement of the pump barrel during reciprocation of the rod string 130 and pump 135.

A portion 140 of a wellhead (shown more fully at 240 of FIG. 2) is seen placed over the wellbore 100. The wellhead portion 140 includes an illustrative tubing head 142. The tubing head 142 includes a tubing hanger and is frequently used to hold the tubing string 120 in tension. This involves setting a tubing anchor (not shown) near the bottom of the production tubing 120, and then pulling up on the tubing string 120 from the surface 101 before locking the tubing string 120 in place using opposing lock pins 144.

Above the tubing head 142 is a stuffing box 145. The stuffing box slidingly and sealing receives a reciprocating polished rod 160. In the system and methods of the present invention, the polished rod 160 resides within an elongated cylinder 150 and is reciprocated using pneumatic pressure. Pneumatic pressure means that a compressible gas is used as the working fluid. The reciprocating polished rod 160 is mechanically attached to the rod string 130, as shown and discussed more fully in FIG. 2, and is cycled by the alternating increase and decrease of gas pressure within the cylinder 150.

The tubing head 142 typically includes one or more side outlets 148. The side outlets 148 receive valves (not shown), and are used during production or workovers to control annulus fluids and pressures. The side outlets 148 also allow access to the annular region 128 by regulators during pressure testing. During normal pumping operations, these outlets allow transfer of gaseous wellbore fluids to the flowline 202 through piping (not shown).

Figure 2:
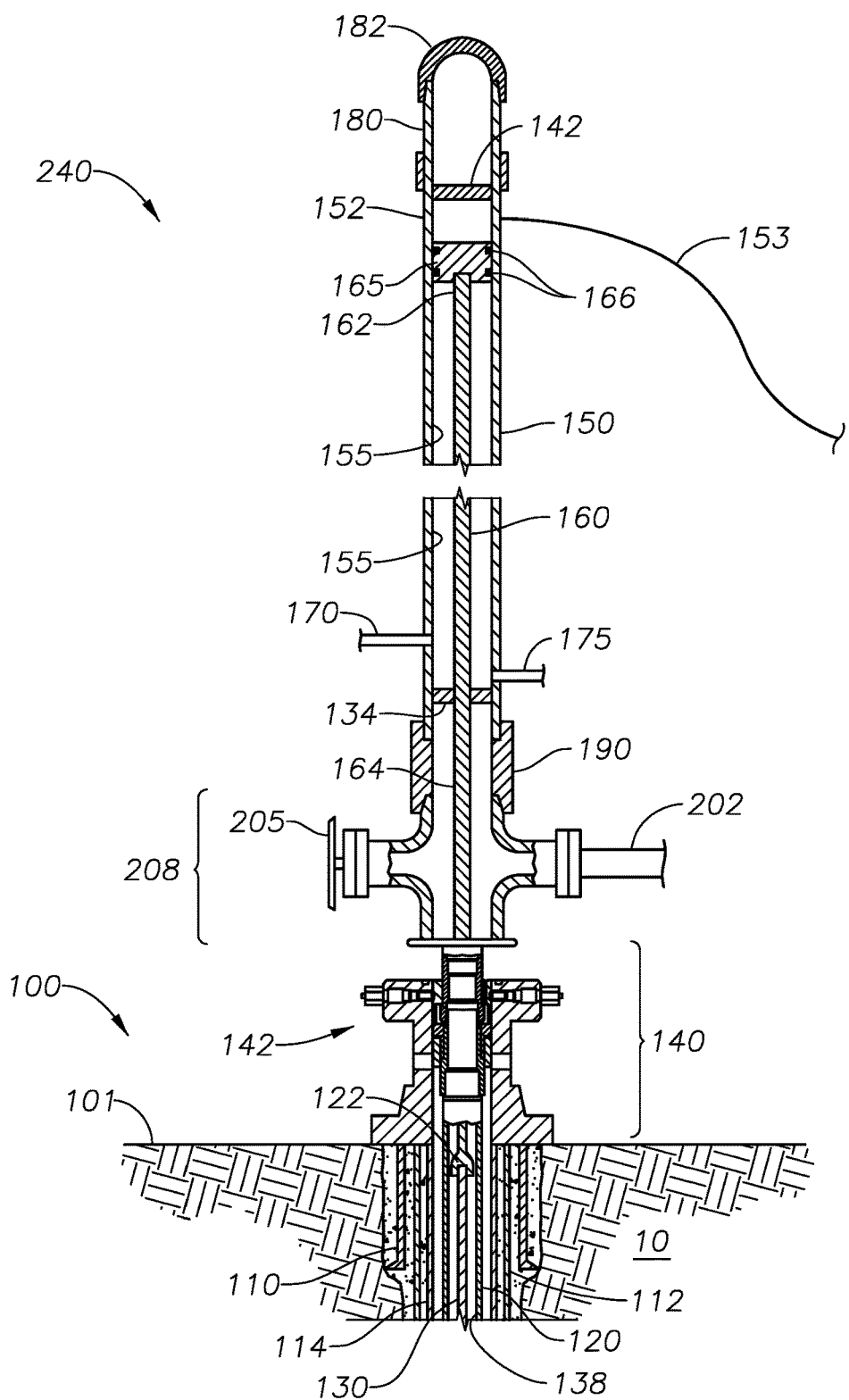
FIG. 2 is an enlarged cross-sectional view of an upper portion of the wellbore of FIG. 1. Here, the wellhead is more fully seen. The wellhead is configured to have a cylinder and a pneumatically operated piston in order to cycle the rod string and connected downhole pump of FIG. 1.

FIG. 2 is an enlarged cross-sectional view of an upper portion of the wellbore 100 of FIG. 1. Visible in FIG. 2 is the surface casing 110, the at least one intermediate casing string 112 and the uppermost portion of the production casing 114. Also visible are uppermost portions of the production tubing 120 and the rod string 130. It is observed that a lower portion 164 of the polished rod 160 is connected to the rod string 130, such as by means of a turnbuckle or a pivoting pin-type connection 122.

In FIG. 2, the wellhead 240 is more fully seen. The wellhead 240 comprises the elongated cylinder 150, the polished rod 160, and a pneumatically operated piston 165. The piston 165 and connected polished rod 160 are reciprocated by a pneumatic pumping system of the present invention (described more fully in connection with FIG. 3) in order to cycle the rod string 130 and connected pump 135 downhole.

In the arrangement of FIG. 2, the wellhead 240 also optionally includes a so-called Christmas tree 208. The Christmas tree 208 is shown somewhat schematically in FIG. 2. It is understood that the Christmas tree 208 will comprise one or more pipes 202 for delivering production fluids and one or more valves 205 for controlling the flow of fluids into or out of the wellbore 100. The Christmas tree 108 is secured to the cylinder 150, for example, by means of a threaded male-to-male coupling 190.

Also visible in FIG. 2 is the tubing hanger 142 and the polished rod 145. The tubing hanger 142 and stuffing box 145 together sealingly supporting the tubing string 130 above the wellbore 100.

It is noted here that in the arrangement of FIG. 1, a small section of the polished rod is seen above the stuffing box 145. In reality, this portion may be housed within the Christmas tree 208 as shown in FIG. 2. In either instance, the polished rod 160 enters another stuffing box 134 that resides at the base of the elongated cylinder 150 and that seals off the gas pressure inside the cylinder 150 to keep it from escaping to the atmosphere.

At a top of the cylinder 150 is a threaded or optionally flanged connector 180. The threaded connector 180 is optionally used to pick up the cylinder 150 during installation over the wellbore 100. The connector 180 includes an optional removable cap 182 that permits an operator to access an inner bore 155 of the cylinder 150.

In some embodiments, a frame, guy wires or a tripod (not shown) are used to stabilize the cylinder 150 over the wellhead 240. This optional feature is most commonly used in windy locations. Such an arrangement may also be desirable where the elongated cylinder 150 is particularly tall, such as when the stroke of the polished rod 160 is very long.

As noted, residing within the cylinder 150 is an elongated polished rod 160. The polished rod 160 is connected to the rod string 130 by means of a coupling 122, so that reciprocation of the polished rod 160 causes corresponding movement of the rod string 130 and connected downhole pump. In this way, upstrokes and downstrokes of the pump may be provided.

The polished rod 160 has a distal end 162 and a proximal end 164. The distal end 162 connects to a piston 165. In FIG. 2, one or more elastomeric or composite rings 166 can be seen along the piston 165, providing the needed seal to keep fluids within the annular bore 155. In addition, a seal 134 comprised of "Vee" packing or other material is preferably provided along the proximal end 164 to provide fluid sealing along the polished rod 160. This effectively serves as a second stuffing box, as noted above.

An optional upper plate 142 is provided above the piston 165. The plate 142 creates a defined volume of fluid within the bore 155 around the polished rod 160. Optionally, a pressure relief valve (not shown) may be provided in the bore 155 just below the plate 142. This keeps pressure from building in the bore 155 above the piston 165 during a pumping operation. Alternatively, as another more preferred option the area above the piston 165 would be vented to one of the low pressure tanks 330. An illustrative vent line is shown at 153 in FIGS. 2 and 3. The vent line 153 allows any working gas that migrates upward past the rings 166 to move be moved out, preferably through a one-way valve (not shown). Gas that moves through line 153 and into the low pressure tanks 330 will ultimately be recompressed.

Finally, the wellhead 240 includes a fluid inlet line 170 and a fluid outlet line 175. The fluid inlet line 170 is seen entering the bore 155 above the lower seal 134. As described more fully below in connection with FIG. 3, a working gas is pumped from a high pressure tank, through the fluid inlet line 170 and into the cylinder 150. Fluid pressure builds in the bore 155, causing the piston 165 and connected rod string 130 and pump 135 to rise as an upstroke. At the end of the upstroke, the gases in the bore 155 are released through a separate fluid outlet line 175. This allows the piston 165 and connected rod string 130 and pump 135 to drop gravitationally as a downstroke. A valve (shown at 332 in FIG. 3) associated with a low pressure gas tank 330 closes to prevent fluids from exiting the bore 155 through the fluid outlet line 175 during the upstroke. The valve 332 may also be adjusted to help control a speed of the downstroke.

As an alternative to the use of separate inlet 170 and outlet 175 lines, the pumping system 300 may remove outlet line 175, and return "exhaled" gas during the downstroke back down inlet line 170. In this instance, line 170 would connect to a tee, with another port of the tee being connected to a gas entry control valve. The remaining outlet of the tee would be connected to outlet line 175 and control valve 332. In this way, the gas flows to the low pressure gas tanks 330 during the downstroke.

Figure 3:
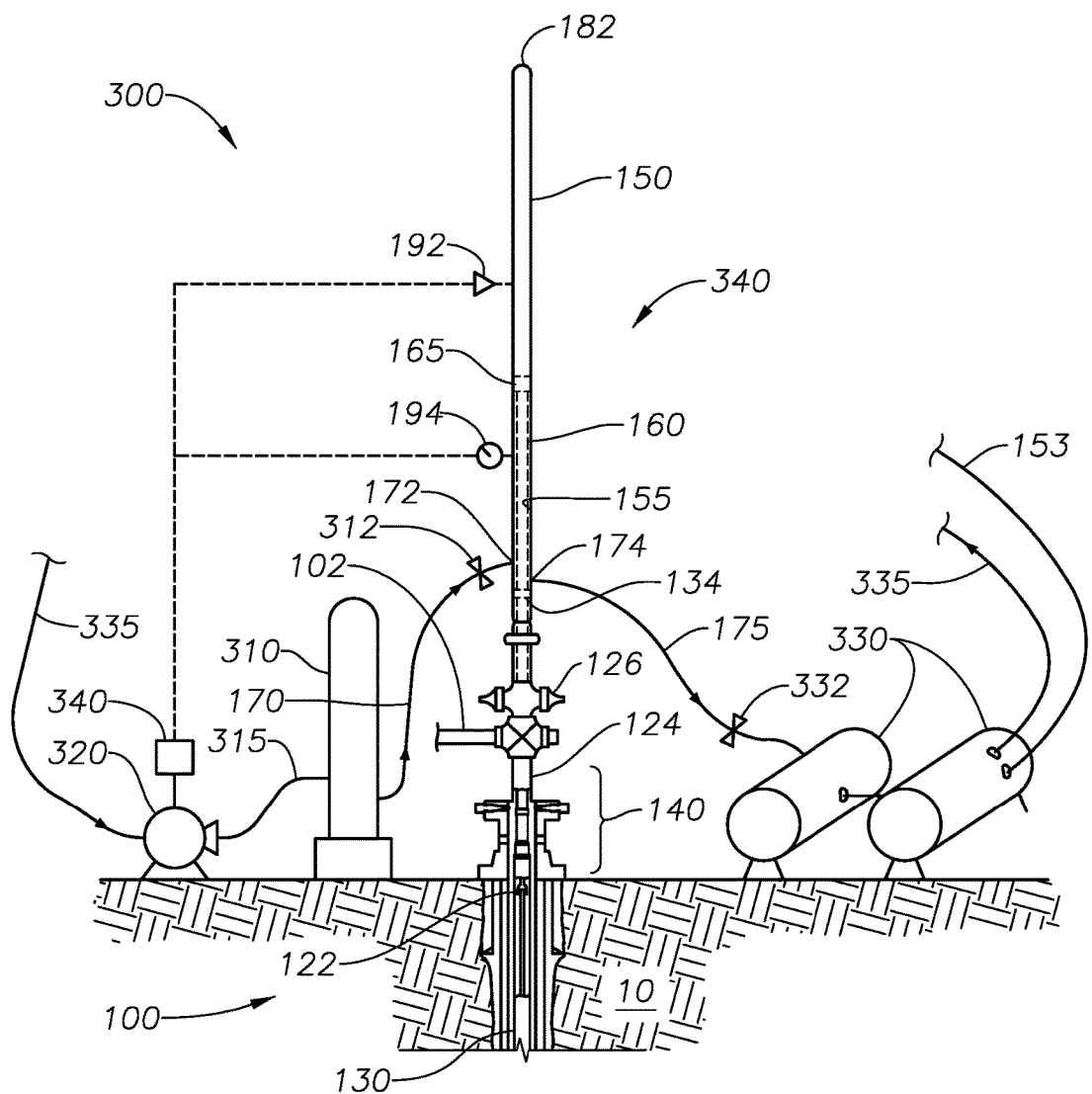
FIG. 3 is a somewhat schematic illustration of a pneumatic pumping system of the present invention, in one embodiment. The pumping system utilizes a controller to control upstroke and downstroke speeds of a downhole pump, and may be used for controlling reciprocal movement of the rod string of FIGS. 1 and 2.

FIG. 3 provides a schematic illustration of a pneumatic pumping system 300 of the present invention, in one embodiment. The pumping system 300 exists for the purpose of lifting hydrocarbon fluids from the subsurface formation 150, up the wellbore 100, and to the wellhead 140/240. The system 300 utilizes the pneumatic cylinder 150, the polished rod 160 and the piston 165 of FIG. 2, all of which are visible in FIG. 3. Also visible is the bottom seal 134 within the cylinder 150, the Christmas tree 208, the coupling 122 and the rod string 130.

In addition to the cylinder 150, the polished rod 160 and the piston 165, the pneumatic pumping system 300 also includes a high pressure gas tank 310. The gas tank 310 holds a warm gas under pressure, such as at 600 to 700 psi. The high pressure tank 310 provides gas for use as a working gas into the cylinder 150. More specifically, gas is fed into the bore 155 between the polished rod 160 and the surrounding cylinder 150, above the bottom seal 134.

The working gas is held in the high pressure tank 310 at a pressure that is, preferably, greater than 250 psi. At the same time, the pressure is preferably below 800 psi. Those of ordinary skill in the art will understand that if the pressure is too high, the system 300 can experience line freeze. In addition, the system 100 can experience the formation of hydrates when the gas drops back to the low pressure, primarily along outlet line 175. In one aspect, the high pressure gas tank 310 is also warmed to prevent hydrates from forming.

The pumping system 300 further includes a compressor 320. The compressor 320 receives (or draws) gas from low pressure gas tanks 330 through a gas return line 335. The compressor 320 then delivers gas under pressure to the high pressure gas tank 310 through line 315.

In the arrangement of FIG. 3, the compressor 320 is on-site, that is, immediately adjacent to the wellbore 100. The compressor 320 delivers gas to the high pressure gas tank 310, which then forwards the compressible working fluid to the cylinder 150 by means of the fluid inlet line 170. An inlet 172 is provided along the cylinder 150 and below the piston 165 to receive gas from the high pressure gas tank 310.

It is understood that it is possible for the compressor 320 to be remote from the wellhead 240/140. This latter arrangement is not preferred as such would require a high-pressure gas transmission line to the high pressure tank 310. However, such an arrangement can facilitate the optional use of a second cylinder (not shown) disposed over a second wellbore (also not shown) that shares the compressor 320 and gases from the high pressure gas tank 310. It is also understood that the relative location of the gas tank 310 and the compressor 320 may be reversed.

The pneumatic pumping system 300 also includes one or more low pressure gas tanks 330. The low pressure gas tanks 330 receive and store gas that is "exhaled" from the bore 155 of the cylinder 155 during the downstroke. The low pressure tanks 330 may be standard low cost propane tanks. Preferably, the tanks 330 operate between 70 and 120 psi. As the polished rod 160 and connected piston 165 gravitationally fall in the cylinder 150 during the downstroke, the gas is released through an outlet 174, and to the fluid outlet line 175. The working gas then moves through the downstroke control valve 332 and into the low pressure gas tanks 330.

The return gas in the low pressure gas tanks 330 may be temporarily stored before being cycled to the compressor 320. In this respect, the flowrate into the tanks 330 during the downstroke will likely exceed the capacity of compressor 320. Alternatively, the return gas may be sent downstream for processing or sale. Where air is used as the working gas, the return gas may simply be vented to the atmosphere. In the arrangement of FIG. 3, a return gas line 335 is shown. The return gas line 335 delivers working gas from the low pressure (downstroke) tanks 330, back to the high pressure (upstroke) tank 310 via the compressor 320. In this way, working gas is sent back to the high pressure tank 310 during the downstroke. An upstroke control valve 312 is fitted along line 315, such as at the cylinder 150, to control a rate at which fluid is injected into the cylinder 150 during the upstroke. In this way, a unique controlled, closed loop working gas system is provided.

It is observed that the high pressure gas tank 310 may be any pressure vessel, including one or more valved pipelines. Similarly, the low pressure gas tanks 330 may be any pressure vessel, including one or more valved pipelines. For purposes of the present disclosure, the term "tank" includes flowlines.

The working gas used in the pneumatic system 300 may be any compressible fluid. In one aspect, the gas is simply air, that is, a combination of oxygen, carbon dioxide, nitrogen and, perhaps, argon and other trace elements. More preferably, the working gas is primarily a light hydrocarbon fluid such as methane, ethane, propane or combinations thereof, as such is readily available on-site as a result of production operations. Some percentages of carbon dioxide, hydrogen sulfide and nitrogen may inevitably be present. In one aspect, the gas has been pre-processed for the removal of water, such as through the use of a centrifugal separator or a so-called knock-out tank. The present inventions are not limited to the type of working gas used unless expressly stated in the claims.

Beneficially, the pneumatic pumping system 300 also includes a controller 340. The controller 340 is used primarily to control the positions of the upstroke 312 and the downstroke 332 valves. Upstroke speed is increased by opening (or by further opening) the upstroke control valve 312, while downstroke speed is increased by opening (or by further opening) the downstroke control valve. Secondarily, the controller 340 controls the speed at which the compressor 320 operates. Together, these control functions enable the operator to control the upstroke and downstroke speeds of the polished rod 160.

It is noted that in the pneumatic pumping system 300, changes in piston velocity and direction are not primarily accomplished by changing the operational speed of the compressor or by starting and stopping the compressor 320, as is done in known hydraulic systems. Instead, corrections and changes to pump speed and direction are primarily controlled by adjusting positions of the inlet 312 and outlet 332 valves. Thus, compressor speed is not changed based on the low and high tank pressures, but indirectly based on whether the upstroke control valve 312 is able to deliver the necessary gas to effect the desired upstroke velocity. If it cannot, the compressor speeds up, elevating the pressure in the high pressure tank 310, causing more gas to move through the control valve 312. Conversely, if the upstroke control valve 312 never fully opens, then there is excess pressure in the high pressure tank 310, and the controller slows down the compressor 320. While one could say that compressor speed changes are used to maintain cylinder pressures in a range, the system is actually designed to take the cylinder pressure only as high as required to lift the piston 365 in the desired amount of time, and no more. If the pressure is too high, the upstroke control valve 312 will never fully open and the compressor 320 will be directed by the controller 340 to slow down, dropping the tank pressure.

The controller 340 may be an embedded programmable logic controller (or "PLC"). The PLC may be, for example, the FMD88-10 PLC which offers an open board design, combined with Ladder+BASIC programming software with an internal clock. Operations software is downloaded into the programmable logic controller (PLC). An Ethernet port may be provided that can connect to other devices or web servers for control or data up/down loading.

The controller 340 represents a micro-processor having various components (not shown). These may include a printed circuit board, digital inputs (or pins) with a high speed counter, an analog input/output card, and a bus port. The controller 340 may also include an expansion port and digital outputs. Finally, the controller 340 may have an LCD interface and optional display, or may have a transceiver for communicating operating state through a wireless communications network, or may be connected to the internet.

The controller 340 may include a memory module. In one aspect, the memory module is a ferromagnetic random access memory card. The card may be, for example, the FRAM-RTC-256 module from Triangle Research. This card has a set of 2×5 header pins which are plugged into the CONN1 connector on the PLC. The card is able to store data should such be desired for data logging.

The controller 340 may also include an on-off selector switch (not shown). This switch may be, for example, the Automation Direct GCX Series Selector Switch, Model GCX1200. A contact block for the GCX switch will also be included. The selector switch is connected to shielded wires each containing, for example, two 18-gauge conductors.

When in the OFF position, the On-Off switch will keep the controller 340 from operating, and the pneumatic pumping system 300 will not operate. A Balluf Micro-pulse position sensor 192 is provided along the cylinder 150 to inform the controller 340 regarding the direction and velocity of the piston 165. In the ON position, the controller 340 controls the rate at which the working gas is injected into the bore 155 in real time by adjusting the upstroke control valve 120. The controller 340 will also control the rate at which exhaust gas is allowed to exit the bore 155 by adjusting the downstroke control valve 332.

Finally, the pneumatic pumping system 300 includes a pressure transducer 194. The pressure transducer is configured to determine a pressure within the bore 155 of the cylinder 150, in real time. The pressure transducer generates an electrical signal. The signal is digitized and processed by the controller 340 and associated circuitry. The signal is thus converted to a rod load signal based on the area of the piston 165.

In operation, at the moment a pressure measurement is made, the Balluf Micro-pulse position sensor 192 will also be queried. These two data points may be taken, for example, about 100 to 200 times per stroke. When graphed, the data points provide a digital surface dynamometer card. Beneficially, this allows the operator to determine pump fillage without resorting to the well-known Gibbs wave equation, which is a second order differential equation. For example, if the piston moves down the cylinder during the downstroke without hesitation, then there is good pump fillage. On the other hand, if the piston hesitates on the downstroke (due to the ball popping off of the traveling valve seat), there is insufficient pump fillage. If insufficient pump fillage is detected, the controller may reduce the downstroke speed by adjusting the downstroke control valve 332, that is, by constricting an orifice associated with the downstroke valve 332.

It is preferred that the downstroke run so slow that there is minimal elastic behavior along the rod string. Thus, load events are negligibly impacted by the elasticity and dynamics. This gives a useable indication of pup fillage without resorting to the well-known Gibbs wave equation.

The pneumatic pumping system 300 thus allows the operator to control pump speed in real time. For example, the operator may set the pump speed at 3 SPM, which makes for a 20 second duration. The operator may also set a 5 second upstroke and a 15 second downstroke for the 3 SPM cycle speed. This arrangement reduces pump slippage and increases pump fillage.

During the 5 second upstroke, working gas exits the upstroke high pressure tank 310 very quickly as it flows through fluid inlet line 170 and into the pneumatic cylinder 150. (Gas also continuously exits the low pressure gas tanks 330 gas return line 175, flows through the compressor 320 and enters the high pressure gas tank 310.) To lift the piston 165 10 feet in 5 seconds, with the complete cylinder full of gas at 400 psi at the top of the stroke, the high pressure tank 310 may depressurize, for example, from 600 psi down to 500 psi. During the next 15 seconds of downstroke, the 400 psi captured in the bore 155 of the cylinder 150 will bleed off through the fluid outlet line 175 and into the downstroke low pressure tanks 330. As exhausted gas enters the low pressure tanks 330, their pressure increases from, for example, 70 psi up to 120 psi. Meanwhile, the compressor 320 continuously takes suction from these low pressure tanks 330, and then pumps the working gas into the high pressure (600 psi upstroke) tank 310. In this way, a closed loop system is provided for the working gas. It is believed that a closed loop pumping system has never been developed for a pneumatic hydrocarbon well pumping system.

If the compressor 320 begins to run too fast, the result will be that pressure in the high pressure (upstroke) tank 310 will elevate above its set minimum pressure, e.g., 600 psi, and the pressures in the low pressure (downstroke) tanks 330 will fall below their set minimum pressure, e.g., 70 psi. The controller 340 will recognize this, and control the compressor 320 speed accordingly.

To speed up the upstroke, the controller 340 will open the fluid inlet valve 312 wider. If the valve 312 is wide open and the upstroke still is not fast enough, then the controller 340 tells the compressor 320 to speed up, manifesting as higher pressure in the high pressure tank 310. Conversely, if the valve 312 is constricted and never opens fully, then the controller 340 may be configured to slow the compressor 320 down, creating lower pressure in the high pressure tank 310. It is recognized that during these operations, some gas will inevitably leak out of the system 300. Accordingly, a source of makeup gas that is at least 70 psig will be needed from time to time.

To control the upstroke time to 5 seconds and the downstroke time to 15 seconds, the operator may adjust the control valves 312, 332 that allow gas to flow out of and back into the cylinder 150. To adjust the control valves 312, 332, the controller 340 determines how fast the piston is moving inside the cylinder 150. This may be referred to as piston velocity. Velocity may be determined by use of the Balluf position sensor 192. This may involve boring out a 1.5" diameter polished rod that supports the rod string with a ⅝" hole that is 10 feet long, and installing a rod with a magnet in this slot. The speed signal will be evaluated by the controller 340, and rapidly adjust the control valve 312, 332 positions.

It is observed that at the start of any downstroke, the piston 165 and connected polished rod 160 are holding the weight of the rod string 130, the pump 135, and the fluid above the pump 135. Accordingly, the gravitational pull of this considerable weight will bias the piston 165 to fall quickly. However, once it has fallen a few inches, the travelling valve of the pump 135 will open, and the weight of the fluid will transfer to the tubing string 120. At this instance, the rod string 130 will weigh, for example, 7,000 pound less. If the piston 165 has 70 square inches, the pressure under it will have to drop by 100 psi before the piston 165 starts falling again. (This is calculated by multiplying 70 inches times 100 pounds per square inch). This creates a sudden velocity reduction, or hesitation event during the downstroke. To keep a steady velocity, which is good for the rods 130 and the pump 135, the system 300 in one embodiment provides for rapid and substantial changes in the downstroke control valve 332 position. Specifically, an orifice in the valve 332 will open further. In this way, the controller 340 will work to smooth out the downstroke travel.

Interestingly, this downstroke hesitation event is a phenomenon unique to the pneumatic pumping system herein. Hydraulic pumping systems do not experience hesitation events on the downstroke when rod load changes as piston movement is controlled through pressure applied by an incompressible fluid. On the other hand, pneumatic pumping systems will experience a travel pause on the downstroke as the piston is controlled by the pressure of a compressible gas. This pause allows the operator to determine a location at which a rod load reduction has occurred, which in turn indicates pump Pillage. This valuable piece of data is acquired through the position sensors, and can be utilized to control pumping speed without resorting to the Gibbs wave equations.

In one aspect, the controller 340 sends signals to the compressor 320 to adjust the pumping speed. For example, pumping speed might be changed from 3 SPM to, for example, 2 or 4 SPM. A 2 SPM cycle lasts 30 seconds, while a 4 SPM cycle lasts 15 seconds. For a 4 SPM cycle, the upstroke might last 5 seconds, while the downstroke would last 10 seconds. So, for 10 seconds (on the downstroke) the high pressure gas storage vessel 310 is replenished, and then for 5 seconds (on the upstroke) the working gas is injected into the cylinder bore 155.

It is observed that the compressor 320 (or pneumatic pumping unit) generally has a very steady volume output, at a slightly varying pressure over the upstroke and downstroke. For example, the discharge pressure in the high pressure tank 310 may vary from 600 to 800 psi between the upstroke and downstroke. The compressor 320 is thus supplying work 100% of the time. This is in contrast to known hydraulic pumping systems where the hydraulic power supply is only providing work during the upstroke.

If an operator desires to run at 3 SPM at the same upstroke and downstroke speed (10 seconds up and 10 seconds down), a hydraulic power supply is going to have to provide twice the energy output as a pneumatic power supply. This is because the hydraulic power supply only outputs energy during the upstroke. In contrast, the compressor 320 in the present design is actually storing energy in the high pressure tank 310 during the 10 second downstroke.

In a situation where the operator desires a more aggressive pump stroke control, the operator might want the upstroke to take 5 seconds, and the downstroke 15 seconds, which is still 20 seconds for 3 SPM. For a known hydraulic pumping unit, the unit is only delivering power for 25% of the time now, meaning that it must deliver four times the energy output of the pneumatic pumping unit. In contrast, the compressor 320 in the present design is storing energy in the high pressure tank 310 during the 15 second downstroke.

Of course, in a true field application, there is no way that a hydraulic pumping unit can lift the sucker rod string in 5 seconds, as this represents an upstroke speed of 6 SPM. A 2 to 3 SPM is typically a maximum upstroke speed for hydraulic units absent the use of very large motors and pumps that operate for only fractional periods of the stroke.

A method of pumping oil from a wellbore is also provided herein. The wellbore has a bore extending into an earth surface. The method first includes providing a wellbore. The wellbore has been formed for the purpose of producing hydrocarbon fluids to the surface in commercially viable quantities. The wellbore also has a rod string extending down into the wellbore, and a positive displacement pump disposed along a bottom end of the rod string.

The method also includes providing a pneumatic pumping system. The pumping system is in accordance with the pumping system described above, in its various embodiments. For example, the pumping system comprises:
  an elongated cylinder defining a tubular body disposed vertically over the wellbore;
  an elongated polished rod residing substantially within the cylinder, the polished rod being operatively connected to the rod string and connected pump;
  a piston connected to the polished rod that is movable between upper and lower rod positions within the cylinder;
  a high pressure gas tank;
  a compressor configured to pump a working gas from a low pressure tank into a high pressure gas tank, and then into the cylinder to create an upstroke of the piston and the operatively connected pump;
  one or more low pressure gas tanks configured to receive the working gas from the cylinder during a downstroke of the piston and the operatively connected pump; and
  a controller configured to receive signals from a position sensor and a pressure transducer, and to adjust a working speed of the compressor in response to (i) position of the piston, (ii) speed of the piston, or (iii) both.

The method also includes operating the compressor to pump formation fluids from the wellbore by means of upstrokes and downstrokes. Each upstroke and downstroke forms a pump cycle.

The method then includes adjusting a pump speed to minimize pump slippage, or to maximize pump fillage. Preferably, the controller is configured to operate the system at a downstroke speed that is less than the upstroke speed. Generally, minimizing pump slippage and maximizing pump fillage is accomplished by increasing the upstroke speed, and reducing the downstroke speed, while keeping the duration of the pump stroke unchanged.

In one embodiment, the pneumatic pumping system further comprises a position sensor disposed along the cylinder to monitor a vertical position of the piston within the cylinder. In one embodiment, the controller monitors piston velocity. Additionally, the pumping system includes a pressure transducer configured to monitor pressure within the cylinder. The controller sends signals in response to piston velocity calculations and pressure readings to adjust a downstroke control valve, which in turn adjusts gravitational pump speed on the downstroke.

In another embodiment, the pneumatic pumping system further comprises:
  a fluid inlet line that transports working gas from the high pressure gas tank to the cylinder during operation of the compressor;
  a fluid outlet line that delivers working gas from the cylinder to the one or more low pressure gas tanks during the downstroke;
  an upstroke control valve along the fluid inlet line configured to adjust a rate of upstroke of the piston and operatively connected pump; and
  a downstroke control valve along the fluid outlet line configured to adjust a rate of downstroke of the piston and operatively connected pump.

In this embodiment, the rate of the downstroke is adjusted by signals sent by the controller 340 to the downstroke control valve 332. The rate of the downstroke may be controlled by choking the rate at which working gas travels into the low pressure gas tanks 330. Similarly, the rate of the upstroke is controlled, at least primarily, by signals sent by the controller 340 to the upstroke control valve 312. The rate of the downstroke may be controlled by choking the rate at which working gas travels into the cylinder. If pressure drops below a level needed to maintain a desired upstroke speed, then the operational speed of the compressor 320 is increased.

In another aspect, the controller 340 is configured to calculate a downstroke speed of the piston 165 in real time based upon position sensor 192 readings, and to adjust a position of the downstroke control valve 332 to smooth out the downstroke speed. For example, if the piston is falling too slowly, an orifice in the downstroke control valve 332 may be enlarged. Reciprocally, if the piston is falling too quickly, the orifice in the downstroke control valve 332 may be reduced. In still another aspect, adjusting a pump speed to minimize pump slippage comprises the controller 340 increasing an operating speed of the compressor 320 if the pressure in the high pressure gas tank 310 falls below a designated psi. Thus, if, for example, the piston 165 is rising too slowly on the upstroke, the controller 340 may increase operating speed of the compressor 320 to accelerate the injection of working fluid into the cylinder 150. This is typically only done if the orifice associated with the upstroke control valve 312 is already wide open.

It is again noted here that the pressure in the high pressure vessel 310 is a function of how fast the pneumatic piston 165 is cycling up and down, and how fast the compressor 320 is running. If the compressor 320 is not putting out a high enough flowrate to support lifting the piston 165 at the desired rate, then the high pressure tank 310 will see a drop in pressure, and the low pressure tanks 330 will see an increase in pressure as the working gas "stacks up" against the compressor inlet (or against the upstroke control valve 312). The primary cure is to open the orifice associated with the upstroke control valve 312 to increase the flow of gas and to increase pressure acting on the piston 165. Failing this, the secondary cure is to speed up the compressor 320, which will increase the pressure in the high pressure tank 310, and lower the pressure in the low pressure tanks 330. These pressures are what the controller 340 will be looking at, and will adjust compressor speed accordingly.

Figure 4:
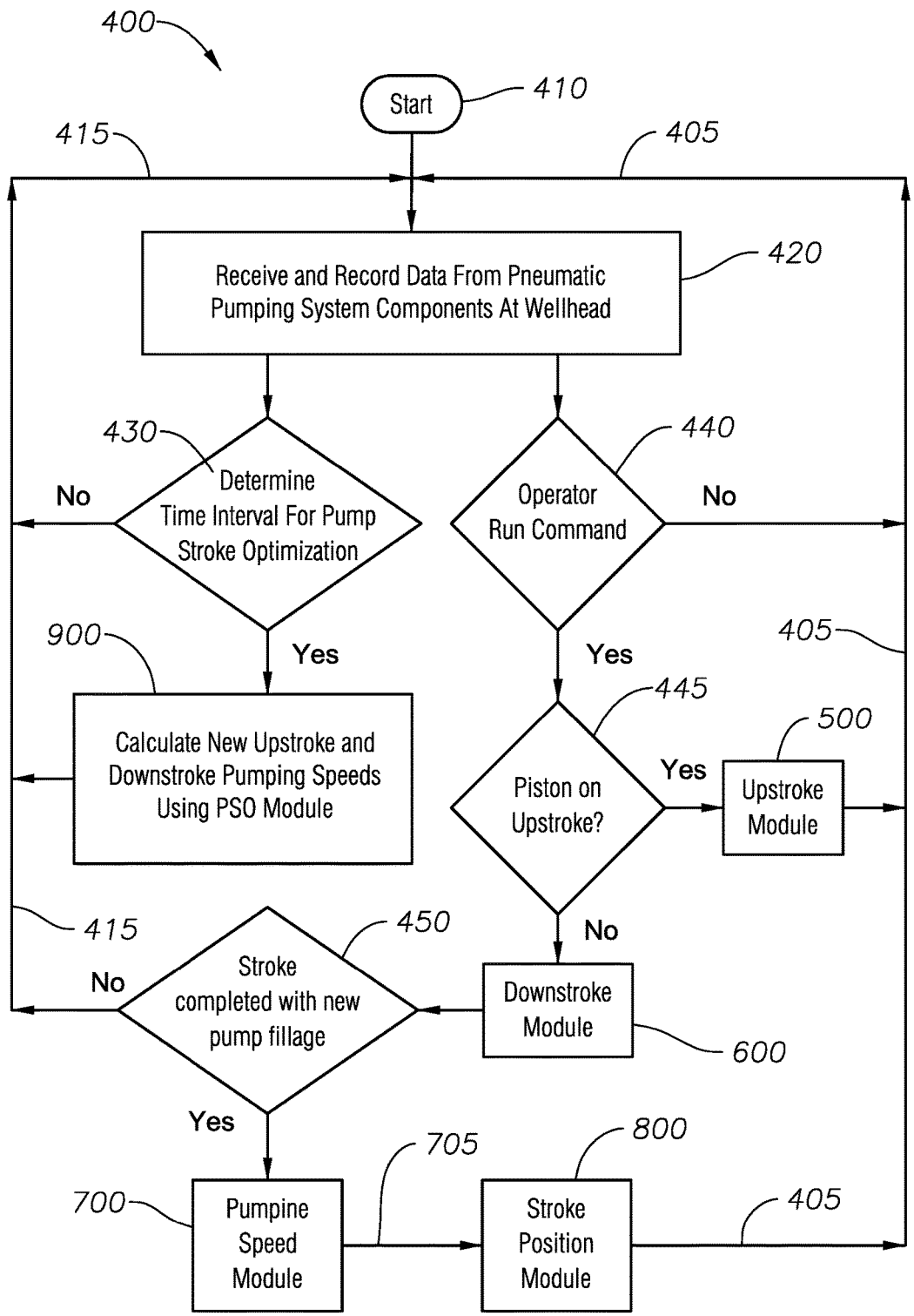
FIG. 4 is a flow chart showing steps for controlling the pneumatic pumping system of the present invention, in one embodiment. This may be referred to as a pump control module.

FIG. 4 is a flow chart showing steps for a control module 400 used for controlling the pneumatic pumping system 300 of the present invention, in one embodiment. The control module 400 shows operation of the controller 340 for the pneumatic pumping system 300 of FIG. 3.

FIG. 4 first shows a Start Box 410. The Start Box 410 simply indicates a beginning of the program for the control module 400. The control module 400 is ready to operate.

FIG. 4 next shows a data acquisition step. This is indicated at Box 420. In Box 420, the control module 400 takes multiple measurements. These measurements include piston position and piston velocity. These measurements are calculated using, for example, the Balluf position sensor described above.

Additional measurements may also be taken and recorded. These include pressure in the low pressure tank, pressure in the high pressure tank, position of the downstroke control valve and cylinder pressure. The data measurements are input to the controller 340 as analog inputs for recording in the data acquisition step of Box 420.

The pump control module 400 of FIG. 4 next inquires as to time. Query 430 checks to see if six hours have elapsed since a pump stroke optimization routine (described below in connection with FIG. 9) has been run. In the illustrative arrangement, the PSO function occurs every six hours to determine new upstroke and downstroke speeds for the piston to keep pump fillage where it should be. In one aspect, only minimum speed of the piston 165 on the downstroke is determined.

It is observed here that so-called Rod Pump Controllers do exist in the industry as add-on products for traditional motor-drive rod pumping units. Such Rod Pump Controllers do not take averages of pump speeds over periods of time; rather, they make speed adjustments based on virtually instantaneous data readings, primarily rod load. This causes the controller to overreact to fluid slugs and waves taking place downhole. In the pump speed optimization module 900 of FIG. 9, data is considered over a designated time period.

It is anticipated as part of the inventions herein to attach the controller 340 to an existing Rod Pump Controller and obtain a signal indicative of pump fillage. Low pump fillage events (called "Minimum Speed Events" or MSE's in the parent application) are tracked. The controller 340 also calculates average pumping speed. For purposes of this and the parent application, the term "averaging" is intended to include not only traditional time-based averages or the arithmetic mean, but also averages of two or more averages taken over various times, moving averages, means of voltage readings (including harmonic means and trimmed means), and smoothed averages. The term "averaging of pump speed data" herein is not limited to one particular method, but includes any mathematical model for measurement of central tendency. Ideally, the designated period of time for averaging is at least two hours, and preferably at least four hours, and more preferably six or eight hours.

For purposes of FIG. 4, if it has been six hours (or some period of time set in Query 430 that is at least four hours), then the routine moves to Box 900 for pump stroke optimization ("PSO"). The PSO module 900 calculates upstroke and downstroke pumping speed set points.

On the other hand, if it has not been six hours (or some period of time set in Query 430 that is at least four hours), then the PSO module 900 is not invoked and minimum upstroke and downstroke pumping speeds are not adjusted.

FIG. 4 also shows an operator run command query. This is provided at Query 440. The operator run query 440 is essentially an On/Off switch. If the switch is off, then the routine returns to the start Box 910 according to Line 405. This may occur if the well is off or the gas facilities is shut down. In this case, upstroke 500 and downstroke 600 modules are not employed.

If the well is operational, then the pump control module 400 asks if the well is on the upstroke. This is shown at Query 445. Upstroke status is determined by the data measurements taken in Box 420. More specifically, movement of the piston is determined from the velocity sensor. If a positive reading is provided by the velocity sensor, then the piston is deemed to be moving up and the routine 400 moves to the upstroke module 500. If a negative reading is provided, then the piston is on its downstroke and the control module moves to the upstroke module 600.

Figure 5:
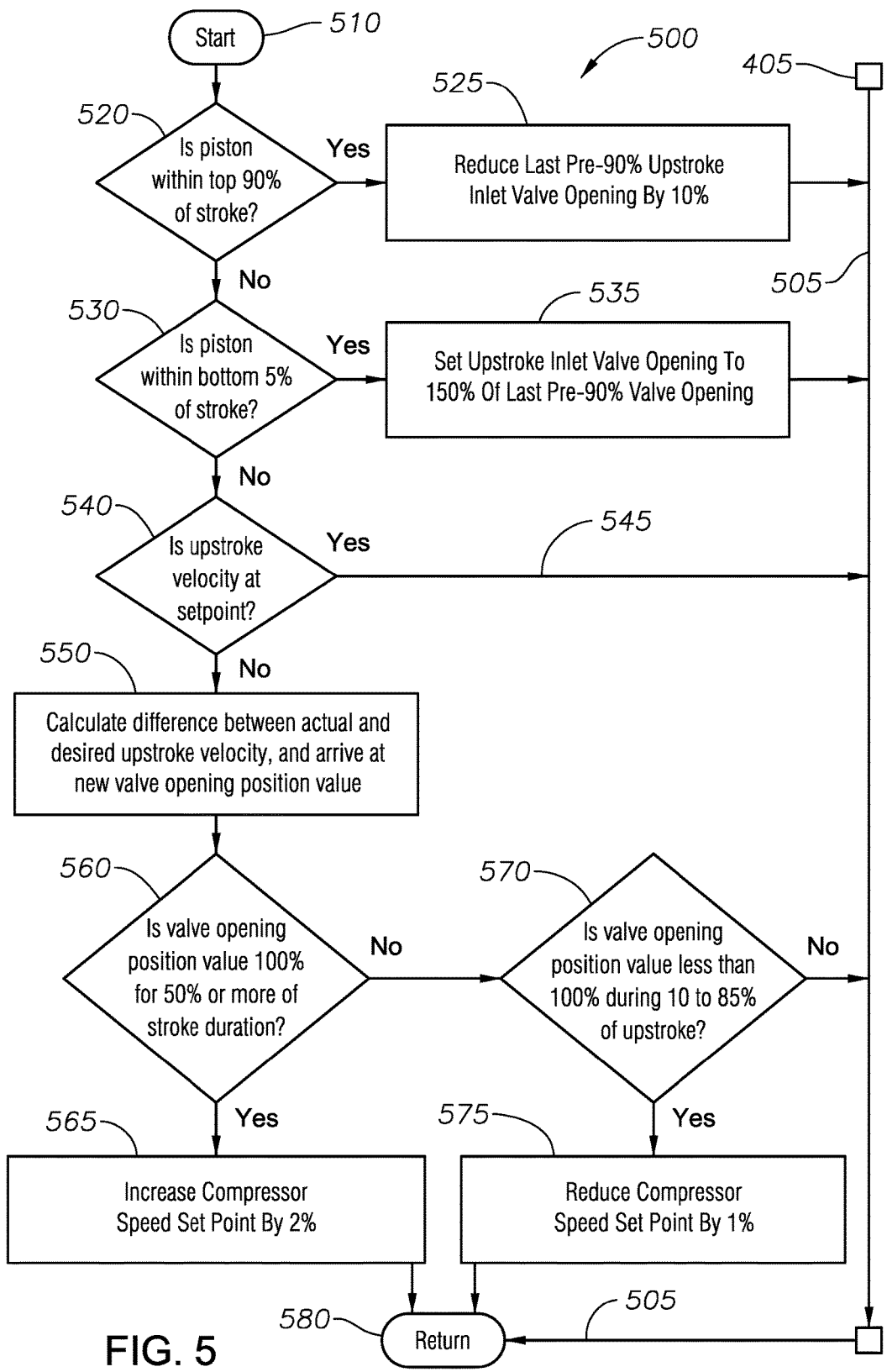
FIG. 5 is a flow chart showing steps for an upstroke velocity module for the pump control module of FIG. 4. The upstroke velocity module is used for adjusting the position of an upstroke inlet valve in the pneumatic pumping system.

FIG. 5 is a flow chart for the upstroke module 500 as may be used in connection with pump stroke control 400 herein. The upstroke module is used to control the position (or size) of the upstroke (inlet) control valve. FIG. 5 first shows a Start Box 510. The Start Box 510 simply indicates a beginning of the program for the upstroke module 500. The upstroke module 500 is ready to operate.

It is observed that the working fluid in this disclosure is a compressible gas and not an incompressible hydraulic fluid. The pneumatic pumping system 300 stores high pressure gas in the high pressure gas tank 310 while the long downstroke is happening. Once the downstroke is completed, the upstroke control valve 312 between the high pressure gas tank 310 and the cylinder 150 opens. This launches the piston 165 upward to commence the upstroke.

FIG. 5 shows a piston position query. This is shown in Query 520. Query 520 asks if the piston is near the top of its upstroke. If the piston is within the top 90% of its stroke, then the module 500 reduces the size of an orifice associated with the upstroke control valve 312. This is shown at Box 525. In the illustrative arrangement of FIG. 5, upstroke module 500 will reduce the last pre-90% upstroke inlet valve position by 10%.

In addition, the upstroke module 500 will optionally further reduce the upstroke inlet valve position proportionally as the piston position goes from 90% to 100% of its upstroke position. The inlet valve is completely closed when the piston reaches the top of its stroke. The routine 500 then returns to Line 405 and the Start Box 410 per Line 505.

If the piston is not at the top of its stroke position, then the routine 500 moves to a next position query. This is shown in Query 530. Query 530 asks if the piston is within the bottom 5% of its upstroke. If the piston is within the bottom 5% of its stroke, then the module 500 sets the upstroke inlet valve position to 150% of its last pre-90% valve position. This occurs when the piston has completed its downstroke, and control valve 332 has closed, and controller 340 determines that a new upstroke has begun. The routine 500 then returns to Line 405 and the Start Box 410 per Line 505.

Once the piston has risen such that it is within 5% of the bottom of its stroke, then the routine 500 moves to a velocity query. This is shown at Query 540. Query 540 asks if the upstroke velocity is at its set point. If it is, then the module 500 returns to the Start Box 510 per line 505. If it is not, then the module 500 moves to Box 550.

Box 550 is a calculation box. In Box 550, the upstroke module 500 calculates the difference between the actual upstroke speed and a desired upstroke velocity or set point. The desired upstroke velocity is calculated in the pump speed module 700 following completion of each downstroke. The result of this calculation is the control valve 312 opening position value. When it is time for the valve 312 to open, the PLC 340 will calculate an opening position as a percentage, and communicate the value of this position to an I to P transducer, or may communicate this value directly to a valve positioner device. Note that the valve 312 is normally closed without a signal from the PLC 340.

The upstroke module 500 next moves to a valve positioning query. This is seen at Query 560. Query 560 asks if the upstroke inlet valve 332 has been fully open for at least 50% or more of its stroke duration. If it has, then the module 500 moves to instruction Box 565. Box 565 instructs the compressor to increase its operating speed set point by 2%.

If the upstroke inlet valve has not been fully open for at least 50% or more of its stroke duration, then the module 500 moves to Query 570. Query 570 asks if the upstroke inlet valve position has been less than 100% open during 10% to 85% of the upstroke. If it has not, then the module 500 returns to the Start Box 510 per line 505. If it has, then the module 500 moves to instruction Box 575. Box 575 instructs the compressor to reduce its operating speed set point by 1%.

Upon making the adjustments from Boxes 565 and 575, the upstroke module 500 returns to the line 405 and the Start Box 410 per Line 505.

Returning to FIG. 4, if the piston is on its downstroke as determined by Query 445, then the downstroke module 600 is used. The downstroke module 600 is used to detect pauses (or hesitation events) in the downstroke and thereby calculate pump Pillage. The downstroke module 600 also determines whether a downstroke end point should be elevated or lowered.

Figure 6:
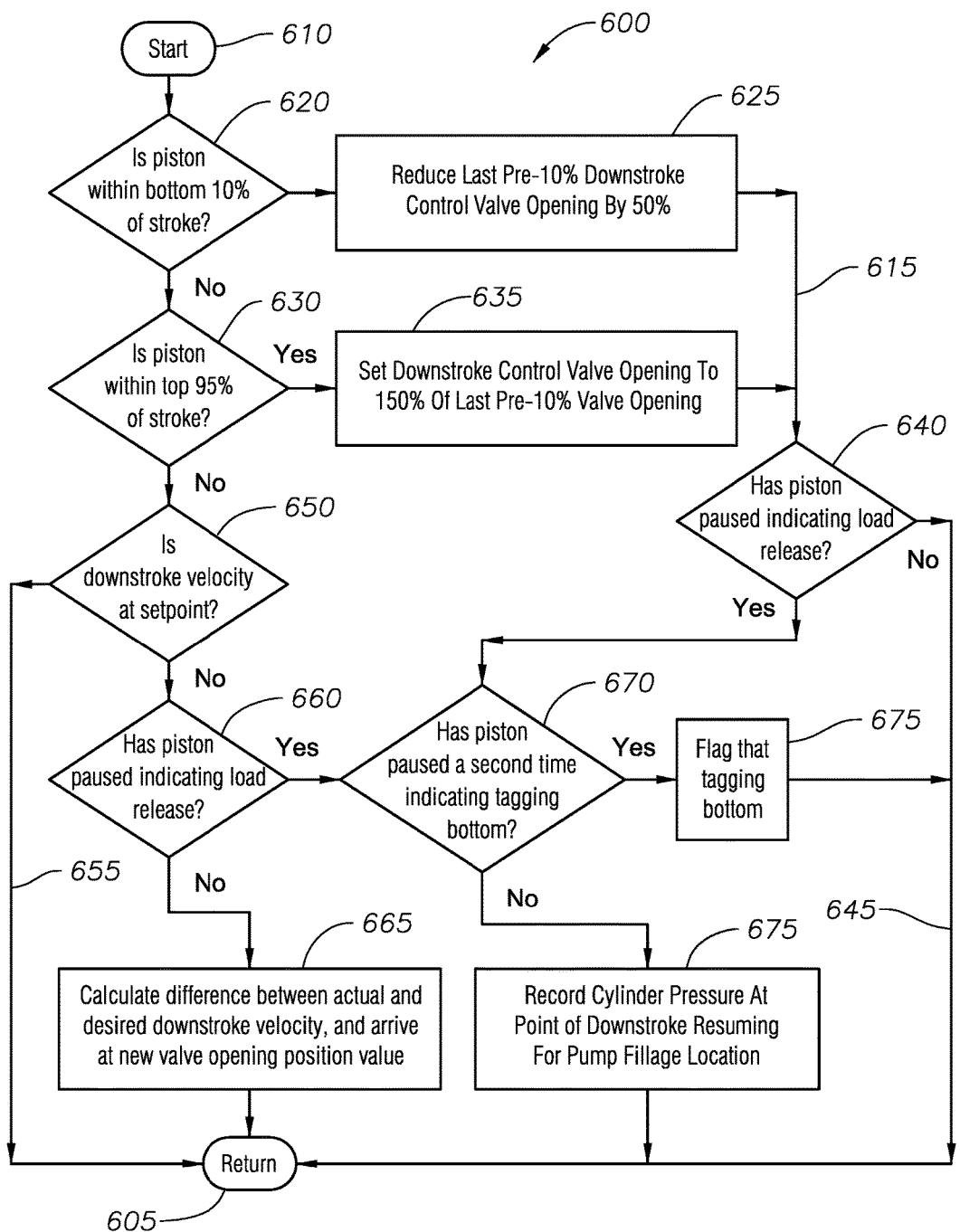
FIG. 6 is a flow chart showing steps for a downstroke velocity module for the pump control module of FIG. 4. The downstroke velocity module is used to detect pauses in piston speed which are indicative of pump Pillage, and to adjust the position of a control valve in the pneumatic pumping system used to control downstroke pumping speed.

FIG. 6 is a flow chart showing steps for the downstroke module 600 as may be used in connection with the pump stroke control module 400 of FIG. 4. FIG. 6 first shows a Start Box 610. The Start Box 610 simply indicates a beginning of the program for the downstroke module 600. The downstroke module 600 is ready to operate.

FIG. 6 next shows a piston position query. This is shown in Query 620. Query 620 asks if the piston is within 10% of the bottom of its downstroke. If the piston is within 10% of the bottom of its stroke, then the module 600 moves to instruction Box 625. In the illustrative arrangement of FIG. 6, downstroke module 600 will reduce the last pre-10% downstroke control valve position by 50%.

In addition, the downstroke module 600 will optionally further reduce the downstroke control valve position proportionally as the piston position goes from 10% to 0% of its downstroke position. The downstroke control valve is completely closed when the piston reaches the bottom of its stroke.

If the piston is not within the bottom 10% of its stroke position, then the routine 600 moves to a next position query. This is shown in Query 630. Query 630 asks if the piston is within the top 95% of its stroke. If the piston is within the top 95% of its stroke, then the module 600 sets the downstroke control valve position to 150% of its last pre-10% valve position.

Upon making the adjustments from Boxes 625 and 635, the downstroke module 600 moves along Line 615 to a next query. This is seen at Query 640.

Query 640 asks if the piston speed has paused. This could be indicative of a load release on the rod string, which in turn could be indicative of either pump fillage or tagging bottom. If no such pauses have been detected (as indicated by the measurements Box 420), then module 600 returns to the pump module of FIG. 4 per Line 645 and then Line 605.

If a pause in piston movement has been detected, then Query 670 asks if the piston has paused a second time. This is indicative that the rod string and pump having tagged bottom. A tagging event is flagged at Box 675. Those of ordinary skill in the art will understand that sucker rods will stretch as they see more load. In addition, repeated cycling in the wellbore can cause rod string fatigue. Together, these can cause the rod string to be stretched, with the rod string causing the pump to bottom out. This is referred to in the industry as tagging bottom, and will mechanically damage rod pumps in a short period of time.

Returning to Query 630, if the piston is not within 95% of the top of its stroke, then the routine 600 moves to a velocity query. This is shown at Query 650. Query 650 asks if the downstroke velocity is at its set point. If it is, then the module 600 returns to the pump control module 400 via Line 655 and then line 605. If it is not, then the module 600 moves to Query 660.

Query 660 asks the same question as Query 640—has the piston speed paused. This again is indicative of a load release on the rod string. If a pause in piston movement (or hesitation event) has been detected, then Query 670 asks if the piston has paused a second time. This again is indicative that the rod string and pump have tagged bottom. A tagging event is flagged at Box 675.

If the piston has not paused a second time, the cylinder pressure is recorded when the downward movement of the piston resumes. This resumption is indicative of pump fillage.

It is noted that if the pause, or hesitation event, happens halfway down on the downstroke, the pump fillage is close to 50%. This can be detected by the controller 340 without need of the Gibbs wave equation, particularly when the downstroke velocity is slow. In either instance, the pneumatic pumping system uses a compressible gas as the working fluid, meaning that significant load changes along the rod string will manifest as velocity changes. This is a significant advantage that has been realized over known pneumatic pumping systems and beam lift systems, which have a fixed velocity and drive through the load change events.

Returning to Query 660, if no such pauses have been detected (as indicated by the measurements Box 420), then module 600 moves to a new calculations box. This is seen at Box 665. Box 665 calculates the difference between the actual downstroke speed and a desired downstroke velocity. The desired downstroke velocity is calculated in the pump speed module 700 following the completion of each downstroke. The result of this calculation is the control valve 332 opening position value. The downstroke module 600 then returns to the control pump module of FIG. 4.

It is noted here that when it is time for the valve 332 to open, the PLC 340 will calculate an opening position as a percentage, and communicate the value of this position to an I to P transducer, or may communicate this value directly to a valve positioner device. The valve 332 is normally closed without a signal from the PLC 340, and only opens when directed by the controller 340.

Figure 7:
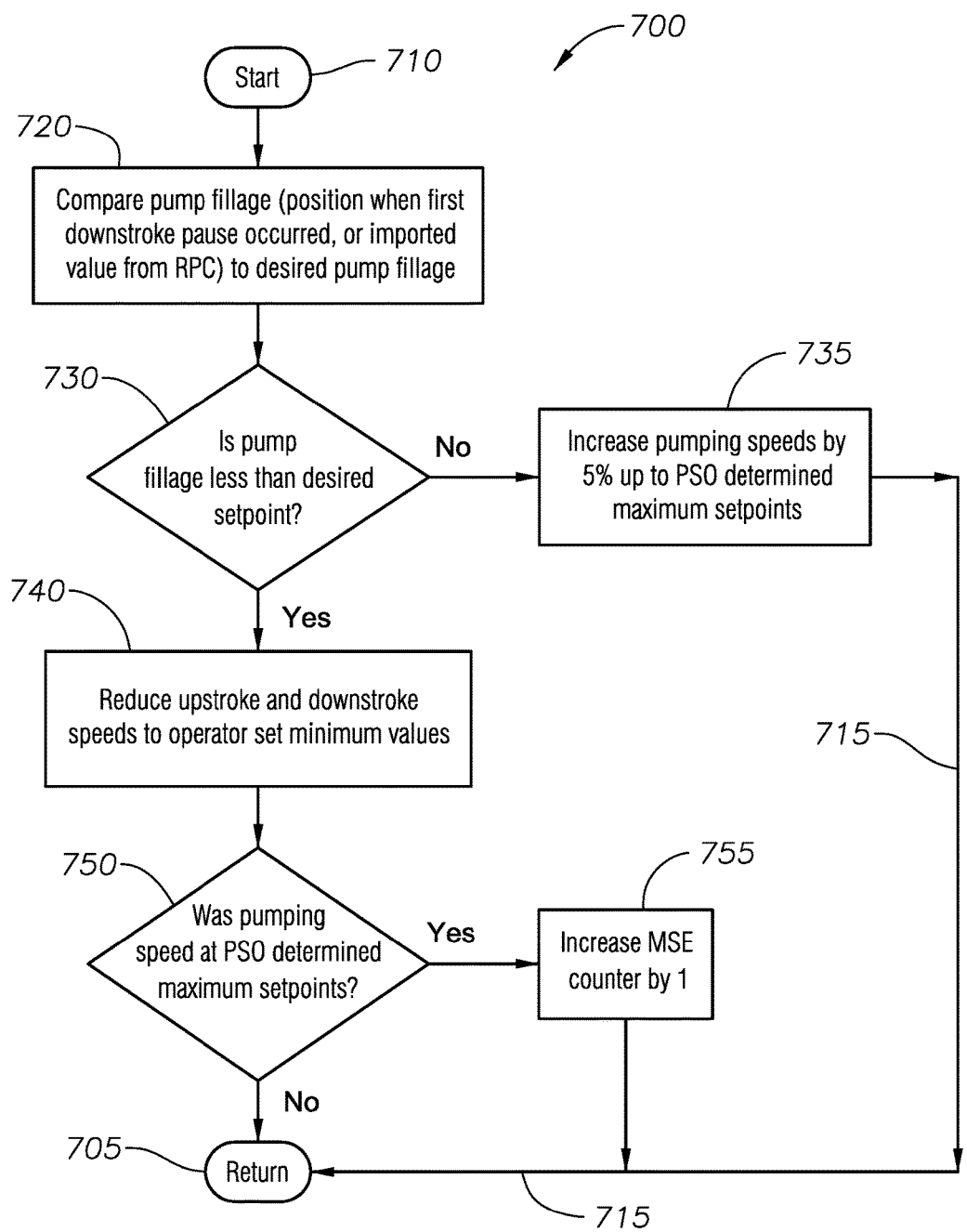
FIG. 7 is a flow chart showing steps for a pumping speed module as may be used in connection with the pump control module of FIG. 4, in one embodiment.

Query 450 of FIG. 4 will inquire as to whether a new pump fillage value has been calculated. If a new pump fillage value is calculated, the routine 400 will return to the Start Box 410 per Line 415. If a new pump fillage value is calculated, then the pump control module moves to a pumping speed module. FIG. 7 is a flow chart showing steps for a pump speed module 700.

FIG. 7 first shows a Start Box 710. The Start Box 710 simply indicates a beginning of the program for the pump speed module 700. The pump speed module 700 is ready to operate.

The pump speed module 700 has a calculation box. This is shown at Box 720. Box 720 compares the current pump fillage value to a desired pump fillage value. Pump fillage is the percentage of the pump that is liquid filled on each stroke, and is arbitrarily set by the operator based on personal experience and preference. Common values are 70 to 80%.

The current pump fillage value is the position when the first downstroke pause occurs, or alternatively a value imported from an existing Rod Pump Controller. It is noted here that the current pump fillage value utilized in module 400 may be furnished from an independent Rod Pump Control unit that is programmed with load and position data from the controller 340, instead of using the calculated pump fillage based on timing of the downstroke hesitation event. This aspect is discussed in much more detail in the parent application, filed in 2016 and incorporated herein.

The module 700 next moves to a query. This is provided at Query 730. Query 730 asks whether the pump fillage value from Box 720 is less than a desired pump fillage set point. If the answer is "no," the pump speeds for both the upstroke and the downstroke are increased by 5% until they are at the maximum desired upstroke and downstroke speed set points as determined in PSO Module 900. This step is shown in Box 735. The pump speed module 700 then returns to the pump control module 400 via Line 715, and then to Line 705.

If the pump fillage is less than the desired set point, then the pump speeds for both the upstroke and the downstroke are decreased to minimum values as set by the operator. This step is shown in Box 740.

The pump speed module 700 next asks whether the pumping speed (before the reduction of Box 740) was pumping at maximum upstroke and downstroke speed set points as determined by the pump stroke optimization module 900. If "no," the pump speed module 700 returns to the pump control module 400 per Line 705. If "yes," the MSE counter (as determined by the PSO module 900) is increased by "1" before returning to the pump control module 400. This is seen at Box 755.

Figure 8:
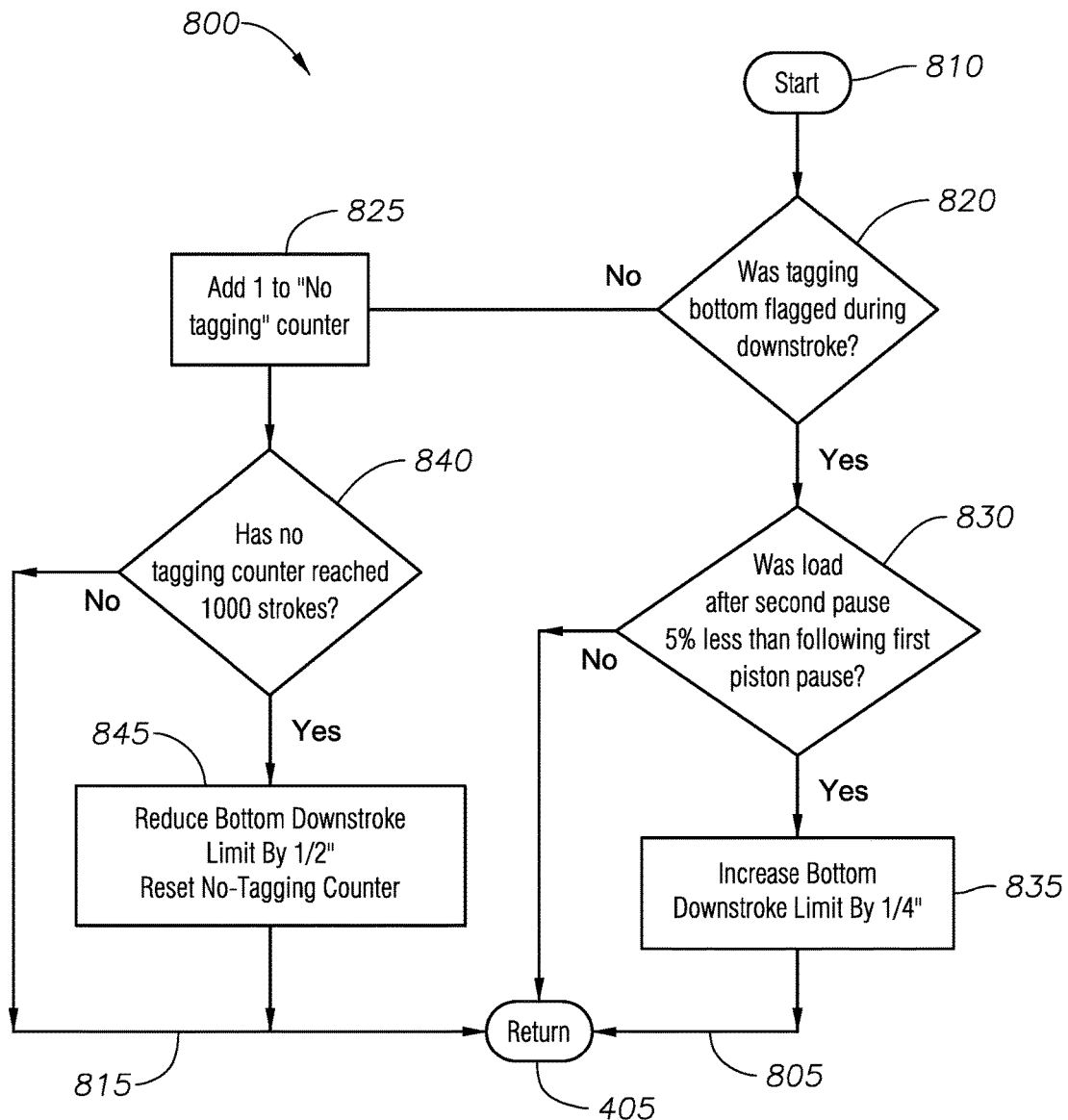
FIG. 8 is a flow chart showing steps for a stroke position module as may be used in connection with the pump control module of FIG. 4, in one embodiment.

After processing speed signals in the pump speed module 700, the pump control module 400 moves to the stroke position module 800. FIG. 8 is a flow chart showing steps for the stroke position module 800 as may be used in connection with the pump control module 400. FIG. 8 first shows a Start Box 810. The Start Box 810 indicates a beginning of the program for the stroke position module 800. The stroke position module 800 is ready to operate.

The stroke position module 800 first asks whether a bottom tagging event was flagged (per Box 675 of FIG. 6). This is shown at Query 820. If the answer is "yes," then the pump speed module 800 asks whether the load after the second pause was 5% less than the load following the first piston pause. This is seen at Query 830. If the answer to this query is "yes," the bottom stroke limit is raised by, for example, ¼". The pump speed module 800 is completed and returns to the pump control module 400 by means of Line 805 and then Line 405.

If, on the other hand, the load after the second pause was not 5% less than the load following the first piston pause, then no change is made to the downstroke limit. This is because the tagging event was relatively minor.

Returning to Query 820, if a bottom tagging event was not flagged (per Box 675 of FIG. 6), then a value "1" is added to a no tagging counter. This is provided at Box 825. The stroke position module 800 then moves to Query 840.

Query 840 asks whether the no tagging counter has reached 1,000 strokes. If the answer is "yes," then the bottom stroke limit is lowered by, for example, ½". The no tagging counter is reset and the pump speed module 800 returns to the pump control module 400 by means of Line 815 and then Line 405.

If, on the other hand, the no tagging counter has not reached 1,000 strokes, no change is made to the downstroke limit and the module 800 returns to the pump control module 400. In this way, the stroke position module is able to maintain the downhole pump in a position where it is barely tagging bottom. This, in turn, helps to maximize pump fillage.

Finally, returning to FIG. 4 and Query 430, if six hours have elapsed since a pump stroke optimization routine has taken place, then the optional feature of pump stroke optimization may take place. This is for the purpose of determining new minimum and maximum upstroke and downstroke speeds for the piston so as to keep pump fillage at a desired place.

Figure 9:
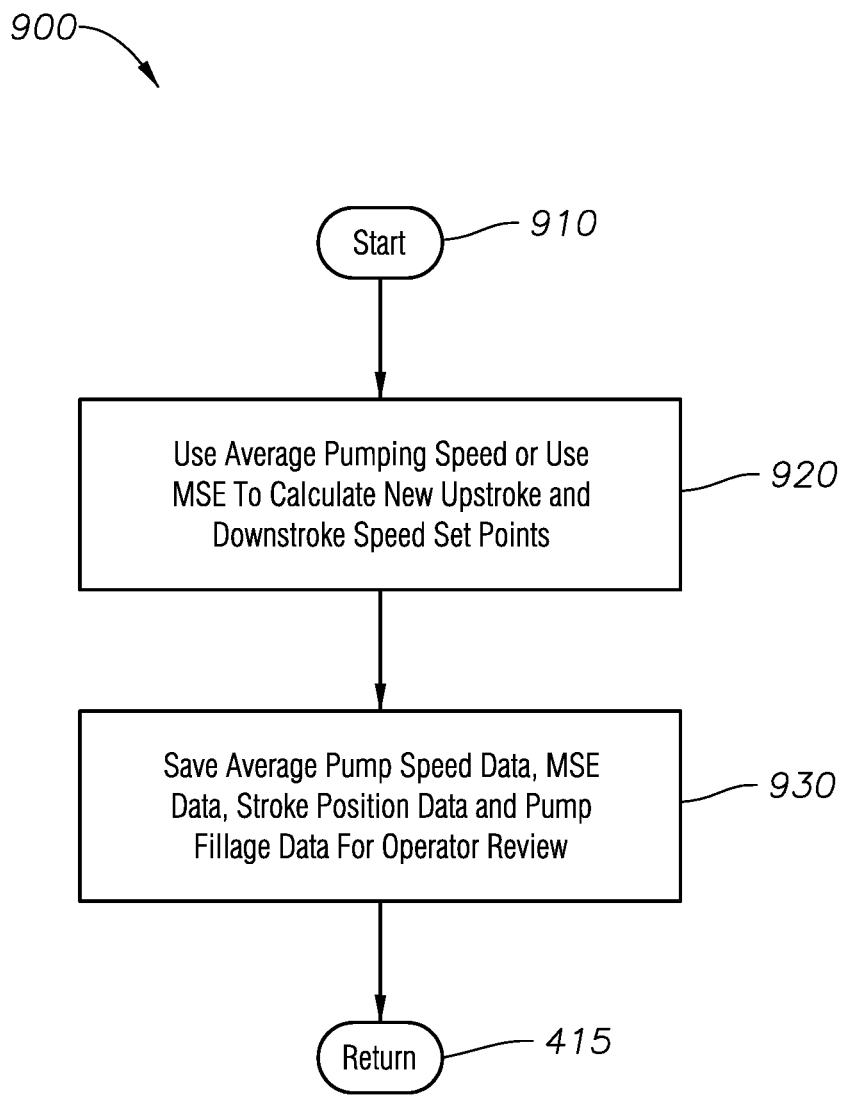
FIG. 9 is a flow chart showing general steps for a pump stroke optimization module. This module is designed to run, for example, every six hours. The pump stroke optimization module prevents unnecessary changes to pumping speed that known pump speed controllers for traditional rod pumping units are prone to cause.

FIG. 9 is a flow chart showing general steps for the pump stroke optimization module 900. FIG. 9 first shows a Start Box 910. The Start Box 910 indicates a beginning of the program for the pump stroke optimization module 900. The pump stroke optimization module 900 is ready to operate.

The PSO module 900 utilizes an optimization routine for the controller 340. Thus, the controller 340 may be referred to as a pump stroke optimizer or a pump stroke controller. The pump stroke optimization module 900 prevents unnecessary changes to pumping speed that known pump speed controllers for traditional rod pumping units are prone to cause.

In Box 920, the controller 340 is configured to periodically calculate the new upstroke U and downstroke D speed set points. These may be taken from the average pumping speed calculation method or the MSE calculation method, both of which are described in detail in the parent patent application.

The controller 340 adjusts upstroke and downstroke speeds incrementally to match the set points U, D in accordance with the steps set out in FIGS. 6 and 7. Changing upstroke and downstroke speeds incrementally primarily means adjusting the upstroke 312 and downstroke 332 valve positions in response to control signals.

In Box 920, an average pumping speed is calculated over a designated period of time of 6 hours. After new upstroke and downstroke set points are provided, various data points are saved. This is shown at Box 930. Data points may include average pumping speed, MSE data, minimum and maximum rod load data, stroke position and pump fillage locations. This data may be synthesized and presented on a web-based platform for internet access, intranet access or internal WAN or LAN access. Thereafter, the pump stroke optimization module 900 returns to the pump module of FIG. 4 and the Start Box 410 by means of Line 415.

As can be seen, an improved pneumatic pumping system and method are offered herein. The system and method seek to maximize pump Pillage (and minimize pump slippage) by varying the proportion of gas between the tanks and by adjusting operating speed of the compressor. Further, variations of the method for pumping hydrocarbon fluids or for optimizing pump speed for a pneumatic pumping system may fall within the spirit of the claims, below. It will be appreciated that the inventions are susceptible to modification, variation and change without departing from the spirit thereof.

I claim:

1. A pneumatic pumping system for a wellbore, comprising:
    a cylinder defining an elongated tubular body disposed vertically over the wellbore;
    an elongated polished rod residing substantially within the cylinder;
    a piston connected to the polished rod that is movable between upper and lower positions within the cylinder;
    a rod string that is mechanically connected to and that extends downwardly from the polished rod, the rod string being configured to extend into the wellbore;
    a positive displacement pump disposed at a lower end of the rod string, the positive displacement pump being configured to pump formation fluids up the wellbore in response to reciprocal motion of the rod string;
    a high pressure gas tank;
    a compressor configured to pump a working gas into the cylinder as part of a closed loop pumping system, wherein the closed loop pumping system comprises the high pressure gas tank and one or more low pressure gas tanks, such that the working gas is pumped:
        from the compressor and into the high pressure gas tank,
        from the high pressure gas tank and into the cylinder disposed over the wellbore, thereby causing an upstroke of the piston and the operatively connected pump,
        on a downstroke of the piston rod and the operatively connected pump, from the cylinder to the one or more low pressure gas tanks, and
        from the one or more low pressure gas tanks back to the compressor;
    a position sensor disposed along the cylinder to sense a vertical position of the piston within the cylinder in real time;
    a pressure transducer configured to sense pressure within the cylinder in real time; and
    a controller configured to receive signals from the position sensor and the pressure transducer, and from those signals adjust upstroke speed, downstroke speed, or both, of the piston within the cylinder.

2. The pneumatic pumping system of claim 1, further comprising:
    a fluid outlet line that delivers the working gas from the cylinder to the one or more low pressure gas tanks during the downstroke; and
    a downstroke control valve along the fluid outlet line configured to adjust a rate of downstroke of the piston and operatively connected pump.

3. The pneumatic pumping system of claim 2, wherein the rate of the downstroke is adjusted by signals sent by the controller to adjust an orifice associated with the downstroke control valve.

4. The pneumatic pumping system of claim 3, wherein the controller is configured to:
    detect pauses in speed during a downstroke in response to signals from the position sensor;
    determine from those pauses whether the pump is tagging bottom; and
    (i) if the pump is tagging bottom, reduce a downstroke length by a designated distance, and (ii) if the pump is not tagging bottom, increase a downstroke length by a designated distance.

5. The pneumatic pumping system of claim 3, wherein the controller is configured to:
    compare actual velocity of the piston during its upstroke with a desired upstroke "set point" velocity; and
    adjust actual upstroke velocity by incrementally adjusting an amount of gas moving into the cylinder from the high pressure gas tank to cause the actual upstroke velocity to move towards the set point upstroke velocity.

6. The pneumatic pumping system of claim 3, wherein the controller is configured to:
    compare actual velocity of the piston during its downstroke with a desired downstroke "set point" velocity; and
    adjust actual downstroke velocity by incrementally adjusting a position of the downstroke control valve to cause the actual downstroke velocity to move towards the desired downstroke velocity.

7. The pneumatic pumping system of claim 3, wherein the controller is configured to:
    detect pauses in speed during a downstroke;
    determine from those pauses a value of pump fillage;
    compare the actual value of pump fillage to a desired set point of pump fillage; and
    (i) if the actual pump fillage is less than the desired set point of pump fillage, reduce the upstroke and the downstroke speeds to an operator set minimum working speed, and (ii) if the actual pump fillage is greater than the desired set point of pump fillage, increase the upstroke and downstroke speeds incrementally up to a determined maximum working speed.

8. The pneumatic pumping system of claim 3, further comprising:
a fluid return line connecting the one or more low pressure gas tanks to the compressor, forming a part of the closed loop pumping system;
a fluid inlet line connecting the high pressure gas tank to the cylinder; and
an upstroke control valve residing along the fluid inlet line, with the upstroke control valve being configured to adjust the flow rate of gas entering the cylinder through the upstroke control valve in response to control signals.

9. The pneumatic pumping system of claim 8, wherein the controller is configured to selectively:
send control signals to the upstroke control valve to expand an orifice associated with the upstroke control valve, and thereby increase gas flow into the cylinder and increase upstroke speed;
send control signals to the upstroke control valve to contract the orifice associated with the upstroke control valve, and thereby decrease gas flow into the cylinder and decrease upstroke speed;
increase a compressor operating speed during the upstroke to increase gas flow through the upstroke control valve and thereby increase upstroke speed;
decrease a compressor operating speed during the upstroke to decrease gas flow through the upstroke control valve and thereby decrease upstroke speed;
send a control signal to the downstroke control valve to expand the orifice associated with the downstroke control valve, and thereby increase gas flow from the cylinder and increase downstroke speed; and
send a control signal to the downstroke control valve to contract the orifice associated with the downstroke control valve, and thereby decrease gas flow from the cylinder and decrease downstroke speed.

10. The pneumatic pumping system of claim 8, wherein the controller is configured to:
calculate a downstroke speed of the piston in real time based upon position sensor readings, and adjust a position of the orifice of the downstroke control valve to smooth out the downstroke speed; and
calculate an upstroke speed of the piston in real time based upon position sensor readings, and adjust a position of the upstroke control valve to increase or decrease upstroke speed.

11. The pneumatic pumping system of claim 10, wherein the controller is configured to increase an operating speed of the compressor if the upstroke control valve is substantially open but the upstroke speed remains below a desired upstroke speed.

12. The pneumatic pumping system of claim 11, wherein:
the controller is configured to operate the system at a downstroke speed that is less than an upstroke speed;
the controller controls the downstroke speed within established minimum and maximum downstroke speeds; and
the controller controls the upstroke speed within established minimum and maximum upstroke speeds.

13. The pneumatic pumping system of claim 12, wherein:
the controller is configured to recalculate the upstroke and downstroke set points at a designated interval of time; and
the designated interval of time is no more often than every four hours.

14. The pneumatic pumping system of claim 2, wherein:
the compressor is a dedicated compressor that resides at a well site for the wellbore; and
the controller is configured to send command signals to the compressor to adjust an operational speed to control a pump cycle time.

15. The pneumatic pumping system of claim 1, wherein:
the high pressure gas tank is maintained at a pressure of between 300 and 800 psi; and
each of the one or more low pressure gas tanks is maintained at a pressure of between 20 and 120 psi.

16. The pneumatic pumping system of claim 1, wherein the wellbore is completed vertically.

17. The pneumatic pumping system of claim 1, wherein the wellbore is completed substantially horizontally or is otherwise deviated from horizontal.

18. The pneumatic pumping system of claim 8, wherein the controller is a pump stroke controller configured to adjust a set speed of the upstroke, a set speed of the downstroke, or both, in response to receiving signals indicative of pump fillage based on piston hesitation events, wherein the pump stroke controller tunes the upstroke and downstroke pump speeds based on an averaging of pump speed data collected over multiple hour intervals of time each day, producing an average value (Av).

19. The pneumatic pumping system of claim 18, further comprising:
a rod pumping control unit configured to receive signals indicative of pump fillage in the form of rod load, and to communicate the signals to the pump stroke controller for use in lieu of signals based on piston hesitation events.

20. The pneumatic pumping system of claim 19, wherein:
the pump stroke controller tunes pump speeds by producing an upstroke speed equal to the maximum working speed less the average value (Av), at the multiple hour intervals each day.

21. The pneumatic pumping system of claim 20, wherein:
the pump stroke controller tunes the pumping speed by sending control signals to the upstroke control valve, the downstroke control valve, and the compressor; and
the control signals are communicated (i) over serial ports using a serial communications protocol using analog voltage or current signals, or (ii) over an Ethernet connection.

* * * * *